US008165948B2

(12) United States Patent
O'Shaughnessy et al.

(10) Patent No.: US 8,165,948 B2
(45) Date of Patent: *Apr. 24, 2012

(54) SYSTEM FOR SELECTING AND PURCHASING ASSETS AND MAINTAINING AN INVESTMENT PORTFOLIO

(75) Inventors: James P. O'Shaughnessy, New York, NY (US); Gregory L. Cowin, Trumbull, CT (US); Stephen M. Downey, Babylon, NY (US); Gregory L. McIntire, Stamford, CT (US); Kevin P. Tyson, White Plains, NY (US)

(73) Assignee: The Globe Resources Group, Inc., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,266

(22) Filed: Apr. 26, 2010

(65) Prior Publication Data

US 2010/0325062 A1   Dec. 23, 2010

Related U.S. Application Data

(63) Continuation of application No. 11/673,881, filed on Feb. 12, 2007, now Pat. No. 7,707,093, which is a continuation of application No. 09/624,330, filed on Jul. 24, 2000, now Pat. No. 7,177,831, which is a continuation-in-part of application No. 09/433,531, filed on Nov. 3, 1999, now abandoned, which is a continuation-in-part of application No. 09/360,003, filed on Jul. 23, 1999, now Pat. No. 6,484,151.

(51) Int. Cl.
    *G06Q 40/00*   (2006.01)

(52) U.S. Cl. .................................... 705/36 R; 705/40
(58) Field of Classification Search ............. 705/10–44
    See application file for complete search history.

(56) References Cited

U.S. PATENT DOCUMENTS

| | | | | |
|---|---|---|---|---|
| 6,018,722 A | * | 1/2000 | Ray et al. ................... | 705/36 R |
| 6,021,397 A | * | 2/2000 | Jones et al. ................. | 705/36 R |
| 6,484,151 B1 | * | 11/2002 | O'Shaughnessy .......... | 705/36 R |
| 6,493,681 B1 | * | 12/2002 | Tertitski et al. ............ | 705/36 R |
| 6,839,685 B1 | * | 1/2005 | Leistensnider et al. ..... | 705/36 R |
| 7,222,095 B2 | * | 5/2007 | Squyres ...................... | 705/36 R |
| 7,685,046 B2 | * | 3/2010 | Wallman ..................... | 705/36 R |
| 7,734,526 B2 | * | 6/2010 | Howard et al. ............. | 705/36 R |
| 7,941,359 B2 | * | 5/2011 | Tanner ........................ | 705/37 |
| 7,987,130 B2 | * | 7/2011 | Waldron et al. ............ | 705/36 R |
| 7,991,672 B2 | * | 8/2011 | Crowder ..................... | 705/36 R |
| 7,996,296 B2 | * | 8/2011 | Lange ......................... | 705/37 |
| 8,005,740 B2 | * | 8/2011 | Arnott et al. ............... | 705/36 R |
| 8,099,344 B2 | * | 1/2012 | Wallman ..................... | 705/35 |

* cited by examiner

*Primary Examiner* — Frantzy Poinvil
(74) *Attorney, Agent, or Firm* — Gerry J. Elman; Elman Technology Law, P.C.

(57) ABSTRACT

The invention is in the field of computer implemented systems and methods for generating a profile of an investor's risk tolerance, providing automated investment allocation advice based on the risk tolerance of the investor, generating at least one list of investments for the portfolio of the investor, allowing for review of the at least one list of investments and information relating to historic and/or hypothetical performance and a description of asset selection methodology, performing automated electronic execution of transactions pertaining the investments, maintenance and monitoring of investment portfolios, and rebalancing of investment portfolios.

22 Claims, 23 Drawing Sheets

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

202

Index Plus A (sample holdings)
This strategy was designed to have a high correlation to the S&P 500 while still attempting to do better than it over time. It is a 30-stock portfolio composed of the ten stocks from the S&P 500 Index with the greatest market capitalization; the top ten stocks from Growth by price appreciation; and the top ten stocks from Value by price-to-cashflow.

Fig-5B

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

Index Plus A (sample holdings)
This strategy was designed to have a high correlation to the S&P 500 while still attempting to do better than it over time. It is composed of t... S&P 500 Index market capital... stocks from G... appreciation; a... from Value by

*Sample Holdings*
Safeway
Apple
Best Buy ★
Cablevision
Ann Taylor
Sonic Automotive

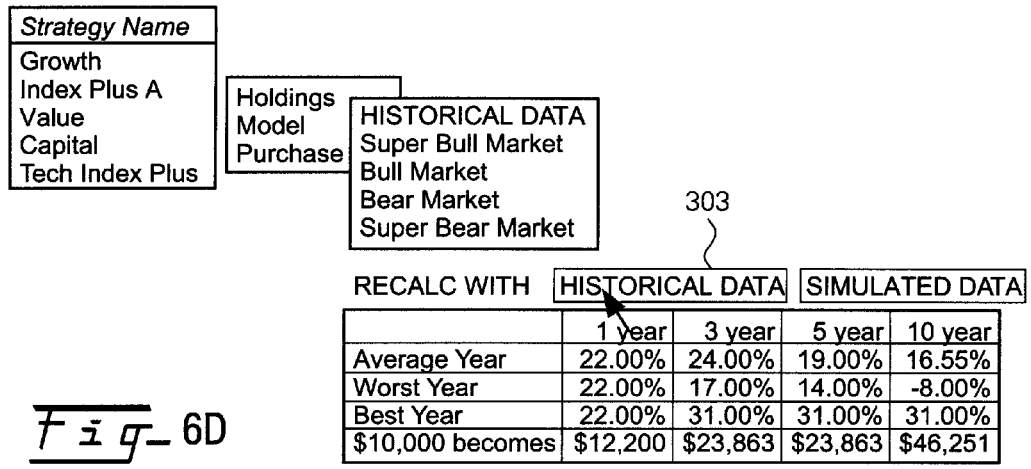
Fig-6D
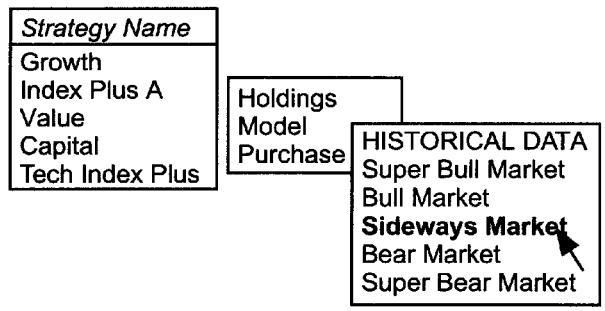
Fig-6E
Fig-7

Fig_12C

NETFOLIO

HOME | INVESTING WITH NETFOLIO | MANAGING YOUR MONEY | SPENDING WISELY | LOG ON | SITE MAP | HELP
BUY AN EBASKET ○
OPEN AN ACCOUNT ○

My Netfolio
New to Netfolio?
☐ What is Netfolio?
☐ Who Needs Netfolio?
☐ What is an Ebasket?
Open an Account
Ebasket Investing
☐ Help Me Choose
☐ Browse All Ebaskets
☐ Build Your Own
☐ Buy a Single Stock
☐ Netfolio Time-Tester
Compare a Netfolio to a Mutual Fund
Quotes & Research
Article Archive
Hulbert Financial Digest
Community
Company Information
Glossary
Search Netfolio:
[   ] [GO]
☐ Hints

View Stocks/Customize: Leaders Growth 10

The following stocks meet the criteria of the Leaders Growth 10 investment strategy as of previous day.

July 24, 2000

Investment Amount: $ [    ]
Account Number: [    ]

Your Cash Balance: $
Your Buying Power: $

[Recalculate]

| | Symbol | Name | Exchange | Bid Tick | Market Price | No. Shares | Est. Total Investment |
|---|---|---|---|---|---|---|---|
| ○ | AAPL | APPLE COMPUTER INC | NASDAQ | | $53 \, 3/4$ | 18 | $967.50 |
| ○ | CLS | CELESTICA INC | NYSE | | $69 \, 5/8$ | 14 | $974.75 |
| ○ | DYN | DYNEGY INC NEW | NYSE | | 78 | 13 | $1,014.00 |
| ● | ENE | ENRON CORP | NASDAQ | | 73 | 13 | $949.00 |
| ○ | ELEX | FLEXTRONICS INTL | NYSE | | $82 \, 5/8$ | 12 | $991.50 |
| ○ | GTW | GATEWAY INC | NYSE | | $62 \, 7/8$ | 16 | $1,006.00 |
| ○ | PHG | KONINKLIJKE PHILIPS ELECTR | NYSE | | $50 \, 5/16$ | 20 | $1,006.25 |
| ○ | LEH | LEHMAN BR HOLDINGS | NYSE | | $116 \, 13/16$ | 8 | $934.50 |
| ○ | MWD | MORGAN STANLEY DEAN WITTR & CO | NYSE | | $94 \, 11/16$ | 10 | $946.88 |
| ○ | SCI | SCI SYSTEMS | NYSE | | $49 \, 9/16$ | 20 | $991.25 | action               symbol   amount
○ Replace selected with next stock in strategy
● Replace selected with [DELL]  [    ]
○ Add a stock                  find symbol
○ Remove selected

[Reconfigure ebasket]

Estimated Investment Value: $9,781.62

| Year Ending | Clone Strategy | S&P 500 | Delta |
|---:|---:|---:|---:|
| 1959 | 20.17 | 11.96 | 8.21 |
| 1960 | 6.11 | 0.47 | 5.64 |
|  |  |  |  |
| 1997 | 43.78 | 33.36 | 10.42 |
| 1998 | 31.68 | 28.58 | 3.10 |
Returns are for model portfolio only. They do not include fees, commissions or bid/ask spreads. Generally, the smaller the stock, the larger the spread and the higher the cost to trade the stocks. Future returns may vary and may not be profitable.
Fig-17
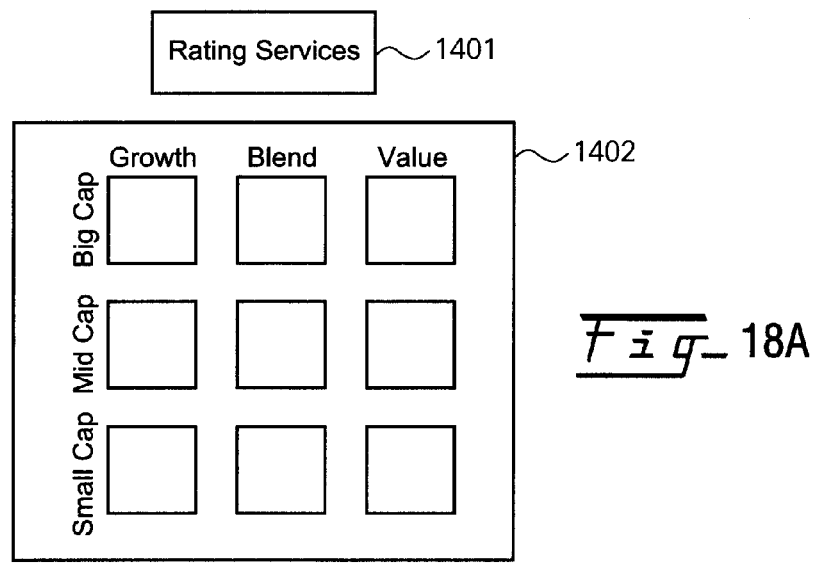
Fig-18A
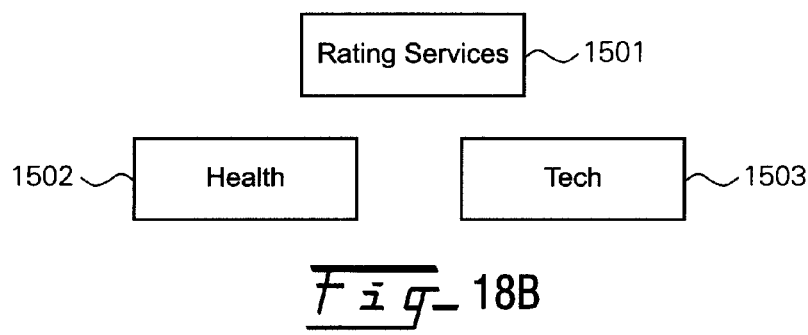
Fig-18B

```
Package com.netfolio.model.process.aggregator;
import java.util.Hashtable;
Import java.util.LinkedList;
public class Aggregator {
        protected Hashtable candidateStocks = new Hashtable ();
        protected Vector universe;
        public Aggregator (Vector universe) {
                this.universe = universe;
        }
        public Vector aggregation () {
//Stage one count the occurrences of an individual stock with in the universe of strategies
                for (Enumeration strategies = universe.elements (); strategies.hasMoreElements (); )
                        for (Enumeration stocks = strategies.elements (); strategies.hasMoreElements ();) {
                                String stockSpecification = (String) stocks.nextElement ()
                                if (!candidateStocks.containsKey (stockSpecification))
                                        candidateStocks.put (stockSpecification, new Integer (0));
Integer newVal = new Integer ((Integer) candidateStocks.get(stocksSpecification).intValue + 1);
candidateStocks.put(stocksSpecification, newVal);
                        }
//Stage two sort the list of stocks by the cached number of times that each occurs in the universe
//Sort in decending order
                Vector symbols = candidateStocks.keys ();
                LinkedList result = new LinkedList ();
                for (Enumeration candidates = symbols.elements (); candidates.hasMoreElements ();) {
                        String ticker = (String) candidates.nextElement ();
                        int popularity = candidateStocks.get (ticker);
                        int i;
                        for (i = 0; i < result.size (); i++)
                                if (candidateStocks.get (results.get(i)).intValue () < popularity)
                                        break;
                        result.add(i, ticker);
                }
//Return this result
                return result;
        }
        public static void main (String args []) {
                Vector AggregatorStockPicks = new Vector ();
                int i = 0;
                int size = 10;
//Create an Aggregator for a list of strategies
                Aggregator aggregator = new Aggregator (/*List of strategies */);
//Select the top X in this case 10 from the sorted vector of stocks
                for (Enumeration e = aggregator.aggregation ().elements (); ) {
                        if (i++ > size) break;
                        AggregatorStockPicks.addElement ((String) e.nextElement ());
                }
        }
}
```

Fig-19

SYSTEM FOR SELECTING AND PURCHASING ASSETS AND MAINTAINING AN INVESTMENT PORTFOLIO

CROSS REFERENCE TO RELATED APPLICATIONS

This is a continuation patent application claiming priority under 35 U.S.C. Section 120 to U.S. patent application Ser. No. 11/673,881, filed Feb. 12, 2007, scheduled to be issued as U.S. Pat. No. 7,707,093, on Apr. 27, 2010 and which is a continuation of U.S. patent application Ser. No. 09/624,330, filed Jul. 24, 2000, issued as U.S. Pat. No. 7,177,831, on Feb. 13, 2007, which is a continuation-in-part of Ser. No. 09/433,531 filed Nov. 3, 1999, abandoned, which in turn is a continuation-in-part of U.S. patent application Ser. No. 09/360,003 filed Jul. 23, 1999, issued as U.S. Pat. No. 6,484,151 on Nov. 19, 2002. The entire contents of all of the above-enumerated patents and applications are incorporated herein by reference.

COPYRIGHT RESERVATION

A portion of the disclosure of this patent document contains material which is subject to copyright protection. The copyright owner has no objection to the facsimile reproduction by anyone of the patent disclosure, as it appears in the official patent file or records, but otherwise reserves all copyright rights whatsoever.

FIELD OF THE INVENTION

The invention is in the field of using a computer to provide automated allocation advice, selection of investment securities, customization of automated advice, execution of investment securities, maintenance/monitoring of investment portfolios and rebalancing of investment portfolios by individuals.

BACKGROUND OF THE INVENTION

Designed as a possible replacement for mutual funds for individual investors, the invention allows individual investors to participate in an online platform that provides customizable, actionable advice at low cost for the general retail consumer. Because of individual ownership, many of the tax disadvantages associated with mutual fund investment are avoided.

For example: on day one, an individual invests $10,000 in a mutual fund. On day two, the mutual fund liquidates some assets acquired prior to day one, which incurs a capital gains tax on the part of all investors as of day one. Thus, this individual is burdened with the tax consequences of a gain which she never received.

SUMMARY OF THE INVENTION

The invention is in the field of using a computer to provide automated investment allocation advice, selection of investment securities, customization of the automated advice, execution of investment securities, maintenance/monitoring of investment portfolios and rebalancing of investment portfolios. A user is connected to the Internet or other communication channel via a personal computer, terminal, personal digital assistant, cell phone or other communication device. Via the communication channel, the user connects to a portfolio management program (PMP) running on a computer. The user completes a questionnaire that the PMP uses to generate a suitable investment allocation and specific portfolio strategy recommendation. The user reviews the strategy and specific information about the strategy. The information is transmitted to the user. The information transmitted includes historic and/or hypothetical performance, historical and/or hypothetical holdings, current securities selections of the strategy, and a description of the strategy's selection methodology.

The user, after making appropriate reviews, makes a decision to purchase the instruments in that portfolio. Now the user sees a list of instruments provided by the PMP computer. The list of stocks is ordered by the degree to which they satisfy the requirements of the strategy. The user can then make the decision whether to accept, reject, or replace any individual security in the generated list or add an individual security. For example, the user can reject a security in the strategy and ask the PMP host computer to replace it with the next security that best fits. Once the user has approved the content of the proposed portfolio, the user enters an amount that the user will invest in accordance with the strategy. The PMP will allocate the investment amount across all the securities in the strategy. The user may authorize the PMP to purchase these selections through a qualified broker. The user may monitor the performance of these instruments subsequent to purchase through the PMP. The user may receive news, alerts, and/or research-related materials for these instruments through the PMP. The user may authorize the PMP to rebalance the investments periodically to an updated list of instruments matching the selected strategy. The user may select a rebalance method that optimizes the tax consequences or the strategy adherence. The user has the ability to accept, reject, or replace any individual security in the generated list or add an individual security as part of the rebalance. The user can set up automatic email notification of rebalance dates or to have the PMP vote the proxy of the shares. The operator of the PMP system would typically collect a payment for this service.

The advantages of this present invention over existing investment methods are numerous:
1. The cost to a consumer for investing in a diversified, advised portfolio is dramatically less than that of mutual funds and similar investment vehicles. Rather than fees that are levied as a percentage of assets or based upon performance, fees under the basic implementation of this system are a flat rate.
2. Flexibility to the consumer is greatly enhanced over other current advised portfolio systems. Consumers have the ability customize the recommendations of an Investment Product to remove instruments the consumer does not wish to purchase. While advised about the implications of customization, the consumer is no longer bound to an "all or none" principle of investing. Tax treatment is vastly superior to mutual funds and other advised portfolio systems available to average consumers. One of the largest problems of mutual fund investment is the potential for embedded capital gains that will be distributed to all shareholders of record whether or not they enjoyed the gain from the stock being sold. For example: on day one, investor buys $100,000 of shares in a mutual fund. On day two, the mutual fund liquidates some long-held security (e.g. 1990 Microsoft) and takes a tax hit. Our day one investor has not enjoyed any of the benefit of increase in price of the liquidated asset but takes the full hit of the tax consequence on the value of the mutual fund's shares on day two.

As highlighted above, the investor does not carry the taxable burden of gains realized by others. Furthermore, as an individual portfolio, the PMP carries the ability to monitor tax lots, which allow better matching of losses against gains. This system allows the consumer to reap the benefits of long-term capital gains versus short-term gains in an automated fashion through rebalancing activities if desired.

3. Ease of use. The current system is the first of its kind in aggregating a complete closed loop of service to the user, namely of product description, examination, selection, customization, execution, monitoring and rebalancing in an automated fashion over the Internet, with the additional advantages listed above.

4. Another benefit the present invention offers individual is that by creating their own diversified portfolio, they will not be affected by the actions of other shareholders. For example, on day one investor buys $100,000 of shares in a mutual fund. The next day, a sufficient minority of current shareholders of that fund decides, for whatever reason, to liquidate their holdings, the NAB of the fund would be materially affected as the portfolio manager would be forced to liquidate current holdings to meet the redemptions. Users of the present invention will face no such calamity because the diversified portfolio is unique to them.

A preferred embodiment of this invention is to provide users with a plurality of Strategies, or quantitative methodologies of security selection from a universe of securities, from which they may then customize and invest. While preferred embodiments of these methodologies are quantitative screens and factoring of a fundamental and market database such as Compustat®, other embodiments of quantitative methodologies applicable to the present invention would include regression analysis, adaptive expectations, attribution analysis and similar models on this or a similar database.

Preferred embodiments of these methodologies include stand-alone strategies designed to outperform a given index or similar benchmark, as well as those designed to mimic or clone indices, funds, and similar benchmarks. However, other embodiments of this invention may include making the investment in accordance with non-quantitative products such as newsletters and recommendations from active managers.

BRIEF DESCRIPTION OF THE DRAWINGS

FIGS. 5A, 5B, 5C, 5D and 5E illustrate what would be shown on a user's screen in connection with a particular investment strategy.

FIGS. 6A, 6B, 6C, 6D and 6E illustrate what would be shown on a user's screen in connection with various market trends.

FIG. 7 illustrates what would be shown on a user's screen with the option to purchase.

FIGS. 12A, 12B and 12C illustrate what would be shown on a user's screen showing the holdings of a particular account.

FIG. 17 illustrates what would be shown on a user's screen comparing a clone strategy and the S&P 500.

FIGS. 18A and 18B diagrammatically represent ratings services as related to various factors.

FIG. 19 shows a computer code implementation of an aggregation method.

DEFINITIONS AND BACKGROUND

Figure 1A:
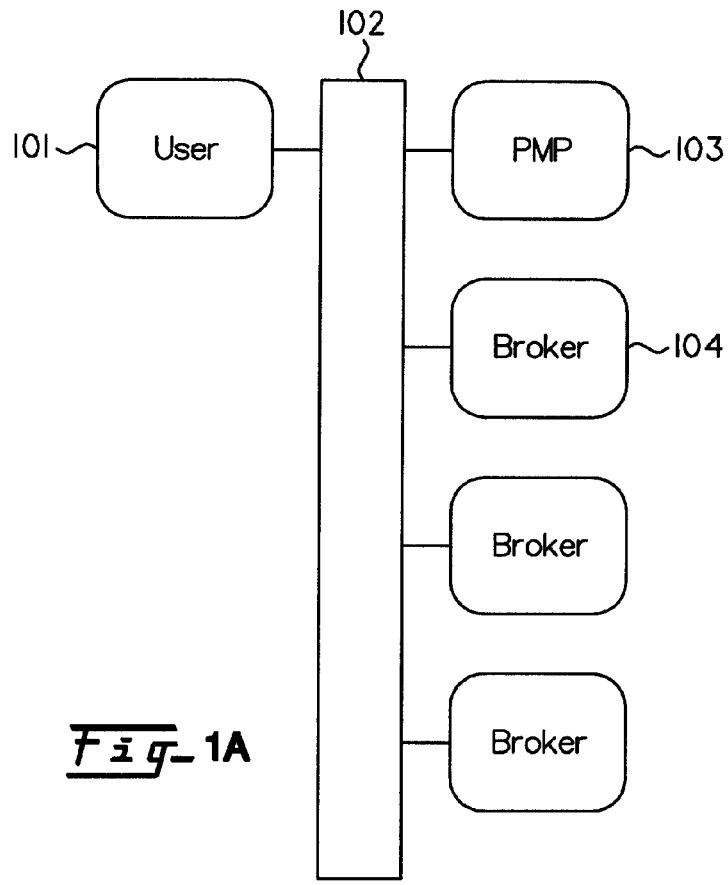
FIG. 1A is a representation of the connections between a user, the PMP computer, and online brokers.

Internet: As used herein, refers to the current Internet or equivalent global communications network as an example of a communication channel, and also contemplates private "intranets," WANs, and their wired or wireless functional equivalents.

PMP: Portfolio Management Program. The Portfolio Management Program may reside on the user's machine, on a remote server or servers, or both as appropriate. The Portfolio Management Program is provided with the ability to communicate with the user through a customary user interface, preferably through an Internet browser program (such as Internet Explorer or Netscape). The program is created in accordance with standard programming practices as known by programmers of Internet applications and Internet stock-trading applications.

Aggregation: count the number of occurrences of an individual stock within the universe of strategies; capture the number of times that each occurs in the universe of strategies; sort the list in descending order and return the result.

Strategy: See, for example, James P. O'Shaughnessy's U.S. Pat. No. 5,978,778 and his books What Works On Wall Street and Invest Like the Best (McGraw-Hill), the disclosures of which are incorporated herein by reference.

The preferred Strategy is a quantitative methodology for stock selection whose efficacy may be judged in part by a historical backtest of this methodology on a database such as S&P Compustat® to judge its hypothetical returns. While the preferred embodiment of these methodologies will be quantitative screens and factoring of a fundamental and market database such as Compustat®, other embodiments of quantitative methodologies could include regression analysis, adaptive expectations, attribution analysis and similar models on this or a similar database. The preferred embodiment of these methodologies includes stand-alone strategies designed to outperform a given index or similar benchmark, as well as those designed to mimic or clone indices, funds, and similar benchmarks. However, other embodiments of this invention may include the investment in non-quantitative products such as newsletters and recommendations from active managers.

Seasonality: This concept illustrates one aspect that time places in the role of investing in a strategy. While two people A and B follow the recommendations of a strategy for 10 years, the performance generated from following those recommendations may be different for B than A because they did not investment did not cover the same point in time. Beyond general movements of the market, a strategy may recommend different stocks at different points in time, such that person A who invested for 10 years, beginning on January 1 of each year experienced a different return than person B, who invested for 10 years, beginning February 1 of each year. Examining various seasonalities, or starting points, provides more timely/accurate information to the consumer.

Disclaimers: The actual pages, screens, and agreements will be laden with appropriate disclaimers as designed by lawyers and stockbrokers skilled in the art of crafting such disclaimers.

Example stocks, brokers, mutual funds and indices: While there may actually be companies called 3M and Walmart and IBM and Philip Morris and E-Trade, the performance numbers stated herein are fictional. The MELJIM MF and MARBRI MF funds, for example, are fictional.

Introduction to Strategy Investing

Knowing how a particular investment strategy performed historically gives one the vital information one needs on its risk, variability, and persistence of returns. Before the commencement of the work of James P. O'Shaughnessy, there was no widely available comprehensive guide to which strategies are long-term winners and which are not. He had access to the historical S&P Compustat database of United States stock market information: forty-three years of results for Wall Street's most popular investment strategies.

It took the combination of fast computers and huge databases to prove that a portfolio's returns are essentially determined by the factors that define the portfolio. Before computers, it was almost impossible to determine what strategy guided the development of a portfolio. The number of underlying factors (e.g. price-to-earnings ratio, dividend yield) that an investor could consider seemed endless. The best one could do was look at portfolios in the most general ways. With computers, one can also test combinations of factors over long periods of time, showing what one can expect in the future from any given investment strategy.

History shows that traditional active management does not work. The majority of actively managed funds do not beat the S&P 500. Passive index fund managers have seen their assets rise as a result, from $10 billion in 1980 to over $250 billion in 1990.

It is very desirable to use an objective rule-based strategy and system for automating, to the extent practicable, the conduct of this decision-making.

The data presented by O'Shaughnessy in his books and in other patent applications and soon-to-issue patents proves that the market clearly and consistently rewards certain attributes (e.g., stocks with low price-to-sales ratios) and clearly and consistently punishes others (e.g. stocks with high price-to-sales ratios) over long periods of time. A paradox remains: tests show high return predictability, but 80 percent of traditionally managed mutual funds fail to beat the S&P 500. Models beat human forecasters because they reliably and consistently apply the same criteria time after time.

Stock market decisions and portfolio constructions are served by a methodical scientific method. Certain rules help in this process. First, all models must use explicitly stated rules without ambiguity or allowance for a private or unique interpretation of the rule. Second, the rule must be stated explicitly and publicly so anyone with the time, money, data, equipment and inclination can reproduce the results. Third, someone using the same rules and the same reliable database must get the same results. Fourth, the results must be consistent over time; long-term results cannot owe all their benefits to a few years. Fifth, the rule must be intuitive and logical and not be derived from the data.

O'Shaughnessy used the S&P Compustat Active and Research Database from 1950 through 1994. O'Shaughnessy used certain methods to evaluate how different rules for constructing portfolios worked over these periods. Certain choices were made regarding size of the portfolio (50 stocks for most strategies), market capitalization (generally, requiring a minimum of $150 million), and annual rebalancing.

Size of the portfolio. As evaluated, stock portfolios contained 10, 25 or 50 stocks. Researchers J. L. Evans and S. H. Archer found most of the benefits of diversification come from as few as 16 stocks. One wants to avoid holding too many or too few stocks. Larger or smaller portfolios are within the scope of the present invention.

Market Capitalization. O'Shaughnessy primarily studied two groups. The first stock group includes only stocks with a market capitalization in excess of $150 million (adjusted for inflation); it is called All Stocks throughout this application. O'Shaughnessy chose $150 million after consulting a trader at a large Wall Street brokerage who felt it was the minimum necessary if he was investing $100 million in 50 stocks in 1995. This figure avoids focusing on tiny stocks and focuses only on those stocks which a professional investor could by without running into liquidity problems. A stock with a market capitalization of $27 million in 1950 is the equivalent of a $150 million stock at the end of 1994. The second stock group includes larger, better-known stocks with market capitalizations greater than the database average (usually the top 16 percent of the database by market capitalization); it is called Large Stocks throughout the application.

Annual Rebalancing. The portfolios studied are constructed and rebalanced annually. Stocks are equally weighted with no adjustment for other variables. For example, if $1,000,000 is invested in 50 stocks, a $20,000 investment is made in each stock. Dividends are re-invested in proportion with the original proportions. At the end of the year, all of the stocks may be sold and replaced with another fifty stocks that meet the criteria of the strategy. Throughout the application, rebalancing refers to this process. Of course, for tax purposes, an investor must be careful in rebalancing that one does not unnecessarily sell and reacquire shares of stock in an existing portfolio when performing the rebalancing. A year was chosen since it is long enough to minimize effects of commissions and costs of rebalancing the portfolio. A term as long as two years or as short as three months could be used as the period after which one rebalances the portfolio in accordance with some investment strategies.

The present invention can allow users to create portfolios that model winning strategies based on the real-time data as it exists in the market at the time of the creation of the portfolio. In preferred embodiments, it is very inexpensive to the user and may revolutionize the multi-trillion-dollar mutual fund industry.

DETAILED DESCRIPTION

An illustrative example of the present invention will be described with reference to the accompanying drawings. Referring now to FIG. 1A, a user 101 is connected to the Internet 102 or other communication channel via a personal computer, terminal, personal digital assistant, or the like. The user 101 connects thereby to the computer running PMP 103. As shown in further detail in FIG. 6A, the user 101 reviews certain strategies and their historic performance. The information is transmitted across the Internet 102 to the user 101. The information transmitted includes such information as historic performance, sample holdings, modeling how the particular strategy and its holding has performed in the past.

The user 101, after making appropriate reviews, makes a decision to purchase the stocks named in that portfolio. The operator of the PMP host computer 103 collects a payment for this service. This price is preferably $29.95.

Now the user 101 sees a list of stocks provided by the PMP host computer 103. The user 101 can then make the decision whether to accept or reject any individual stock in the generated list. For example, if the user 101 rejects the tenth stock in a ten-stock strategy, the PMP 103 presents the eleventh stock as a substitute, which may in turn also be rejected. Once the user 101 has approved the content of the proposed portfolio, the user 101 enters an amount that the user 101 will invest in accordance with the strategy.

If the strategy has ten stocks, for example, and the user 101 invests $100,000, the user will have $99,970.05 to invest in the ten stocks or $9,997 per issue.

If the user 101 already has an account with an online broker 104, then the operator of the PMP system will receive a one-time fee from that online broker 104 when the user 101 purchases the portfolio through the online broker 104. The one-time fee for referring to an existing account is preferably $30.

If the user 101 does not have an account with an online broker 104, then PMP 103 provides suggestions to select an online broker 104. Once the user selects an online broker 104, the operator of the PMP will receive a one-time fee from that online broker 104 in the amount of $150. Since online brokerages are currently spending about $400 for each account that opens with them, everyone wins. The operator of PMP gets paid, the investor gets a cheap basket trade, and the online brokerage gets a new client. New clients—a) add to income through any margin trades; b) own stocks that may be loaned out by the broker; c) receive credit card and other solicitations; d) increasing assets allowing the broker to be better able to borrow, obtain better financial deals, and increased velocity of trading. The broker also gets to put on the 'white hat' of encouraging investors to be in the market for the 'long term' by providing this type of instrument. The reality is that a portfolio of thirty to forty stocks is more likely to generate trades than an account with less stock, and so these accounts will be highly prized and perhaps fought over by online brokers. The present invention seeks to drive mid-tier investors online by providing low cost, tax savings, information, and control of the online portfolio. The present inventors want to make the average Morningstar mutual fund a relatively expensive way for an investor to achieve the benefits of a diverse portfolio.

Once the user 101 has an online broker account in which to trade and funds have arrived, the user 101 decides to whether or not to buy the list of stocks suggested by the PMP 103. If the user 101 does buy the stocks, the user 101 is presented with a customizable portfolio screen showing all the holdings. See, for example, FIG. 12B. This information is optionally stored on the fixed disk (hard drive) of the user's computer, on the computer that hosts the PMP 103, or preferably both. The user can then sign up for automatic notification of drop in price in certain stocks, place sell orders, etc. as necessary. In addition, the user 101 can sign up for automatic proxy voting.

The user winds up with a balanced portfolio of stocks for $30. This is much cheaper than even the cheapest online brokerage charges, and much cheaper than those charges made by traditional brokers. The user's balanced portfolio is akin to their own personal mutual fund, but without some of the disadvantages that plague those mutual funds.

Figure 1B:
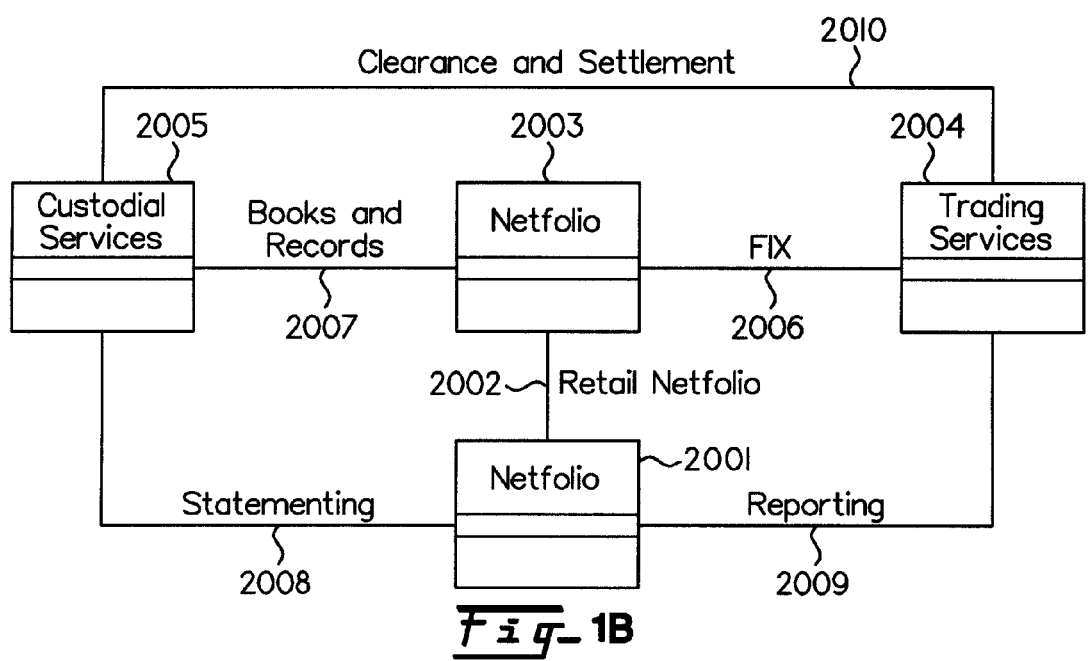
FIG. 1B is a block diagram illustrating the relationship of the parties to various transactions in accordance with the invention.

As shown in FIG. 1B, an operator of a PMP system may, for example, be Netfolio, Inc. In such a system, the basic retail Netfolio portfolio management service 2003 (via a PMP system) is provided to a customer 2001, who is a person or family unit that maintains an subscription with Netfolio 2003, a trading account with the organization that provides trading services 2004 and on whose behalf securities are held by the provider of custodial services 2005. Trading services 2004 are offered by the trading arm of a broker-dealer. These services include, for example, trade execution via the FIX protocol 2006, trade confirmation, etc. Custodial services 2005 are provided by the custodial unit of a broker dealer. In accordance with this aspect of the invention, custodial services 2005 are not necessarily provided by the broker-dealer that provides the trading services 2004. The provider of custodial services 2005 provides books and records 2007 to Netfolio 2003 and statementing 2008 to the customer 2001. The provider of trading services 2004 provides reporting 2009 to the customer 2001. Clearance and settlement 2010 of trades are generated between the trading services provider 2004 and custodial services provider 2005.

Turning back to FIG. 1A, the PMP system 103 is seen to provide recommendations in the form of strategies to the user 101 through the Internet 102. The PMP 103 also offers execution of those recommendations through a broker 104 on behalf of the user 101. In this way, the user 101 will interact with the broker 104 through the PMP 103.

In order to do this a user must first create a subscription with the PMP and have an account with a qualified broker if the user wishes the PMP to provide execution of its recommendations.

Figure 1C:
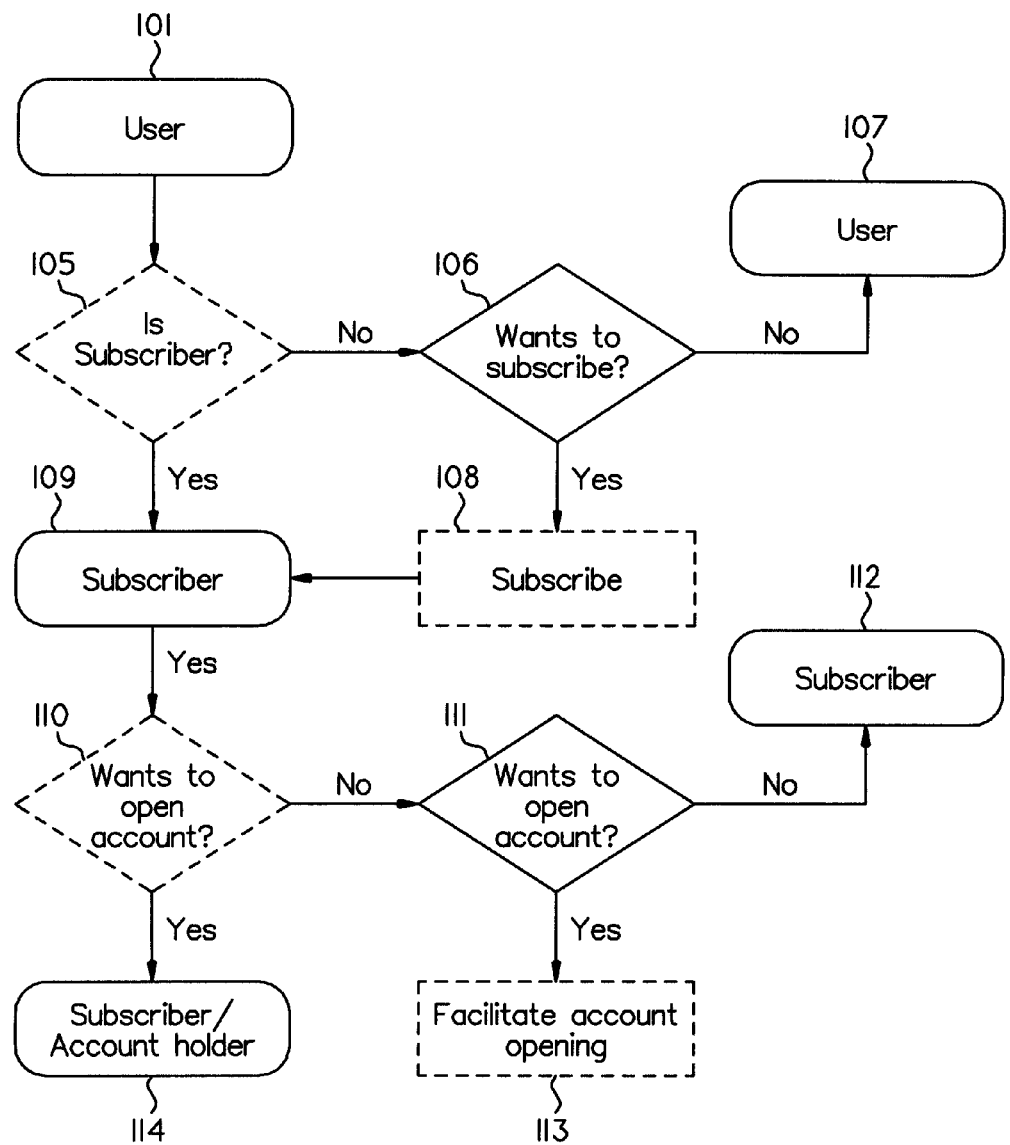
FIG. 1C is a flowchart illustrating how the PMP guides a user through creating a subscription to the PMP as well as facilitating opening an account with a qualified broker.

In FIG. 1C, this process is detailed. A user 101 may look at available strategies (strategy recommendations) and various content for free. However, to receive securities recommendations for investment that are the products of applying said strategies to the current universe of stocks in the marketplace, the user 101 must become a subscriber 109 to the PMP 103 service. At each point where actionable security recommendations are to be given by the PMP 103, the PMP 103 will determine if the user 101 is a subscriber in evaluation 105. If not, the PMP 103 will offer the user 101 the opportunity to subscribe to one of the various levels of service offered by the PMP 103 in the subscribe decision 106. If the user declines to subscribe in decision 106, then the user 101 retains the status of user in result 107 and will not receive security recommendations for investment. If the user 101 elects to subscribe in decision 106, then the PMP will subscribe them to the level of service of their choice in subscription process 108. The completion of this process will designate the user with a subscriber status 109.

Subsequently, a subscriber 109 must have an account open with a qualified broker 104 if the subscriber 109 desires the PMP 103 to execute trades on their behalf. Determining if a subscriber 109 has an account open with a qualifying broker is PMP evaluation 110. If not, the PMP 103 offers to facilitate the creation of an account with a qualified broker 104 through the account-open process 111. If the subscriber 109 elects not to open an account, he retains the status of a subscriber as seen in 112, and will receive security recommendations but will have to execute those recommendations outside the PMP 103. If the subscriber 109 agrees, the PMP 103 will facilitate the opening of a brokerage account with a qualifying broker 104 in facilitation process 113. The result of this process is that the subscriber 109 becomes identified as both a subscriber and account holder 114.

Figure 2:
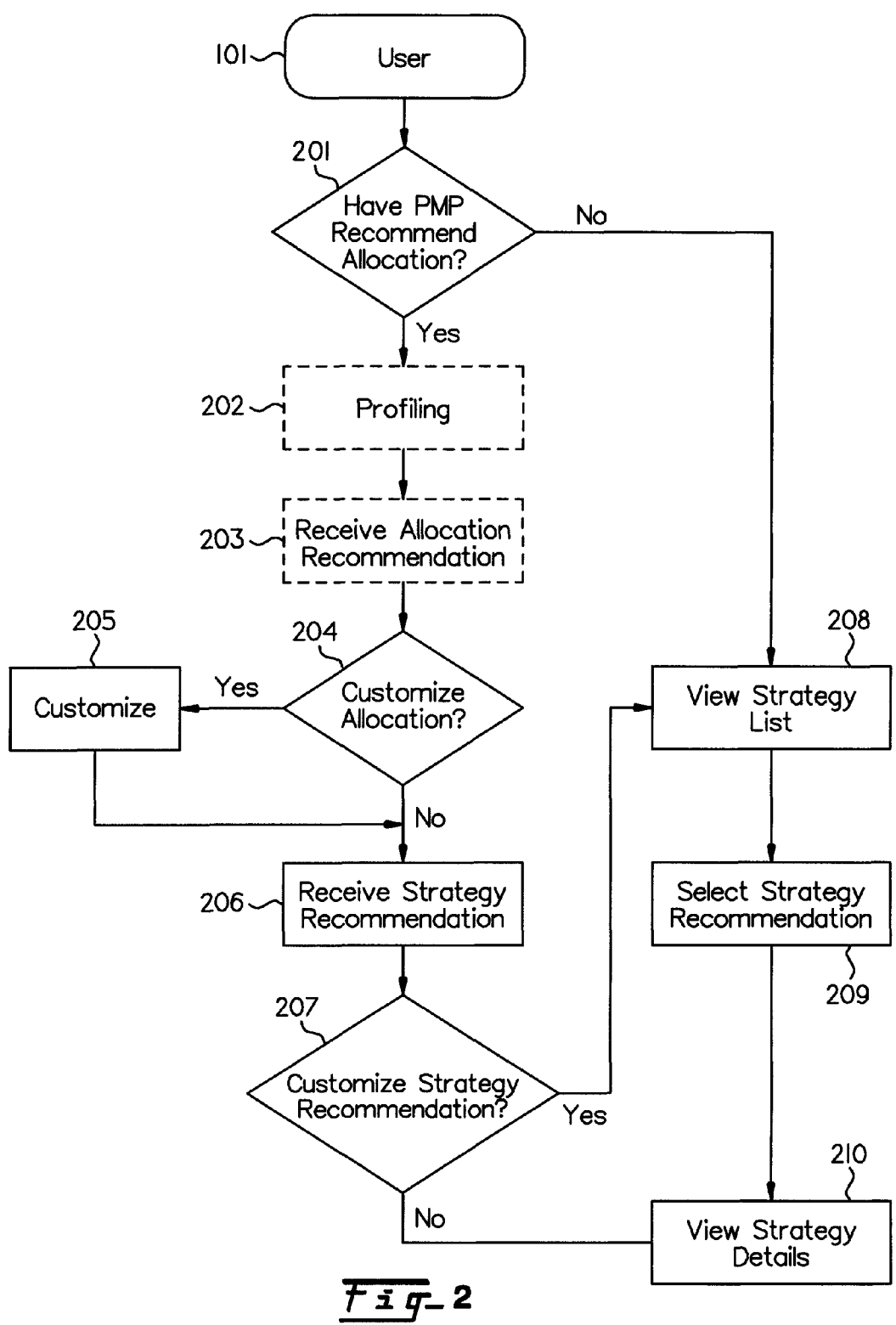
FIG. 2 is a flowchart illustrating aspects of the present invention.

Using the concepts of FIG. 1C, the process of receiving recommendations from strategies is illustrated in FIG. 2. A user 101 who is on the PMP system 103 may choose to have the PMP 103 either present him with a tailored allocation and recommendation or search among the plurality of strategies to create his own recommendation in decision 201.

If the user 101 elects the PMP 103 to present an allocation and recommendation, the PMP 103 proceeds to the Profiling process 202. In the Profiling process 202 the user 101 is given a risk questionnaire by the PMP 103. User 101 completes the questionnaire, which seeks to measure the ability of the user 101 to handle various forms of investment risk by asking questions related to age, income, savings, savings rate, loss tolerance, investment experience/knowledge, purpose of investment, duration of investment, and preferences for size, style and domicile of investment. The PMP 103 scores a the answers to these questions provided by the user 101 to determine a suitable, tailored allocation recommendation 203. The allocation recommendation 203 consists of recommendations of percentage investment in cash, fixed income instruments and equities of domestic and foreign domicile. The user has the opportunity to customize this allocation recommendation in decision 204. If desired the user may enter a customization process 205 in which he can alter the recommendation of the PMP 103. The user 101 completes this process when he is finished with customization.

The equity portion of the allocation recommendation 203 will be comprised of a strategy recommendation 206, which is presented at the end of customization 205 or after the decision 204 if process 205 was not desired. Once again the customer is presented with a customization option 207. Here he has the ability to customize the strategy recommendation itself. This may happen before of after he has viewed the details of any particular strategy recommendation 210.

If the user 101 chooses to customize the strategy recommendation 206 or answers no to the allocation recommendation decision 201, the PMP 103 will display to the user 101 the plurality of strategies in process 208. At this point the user 101 may select one of the strategies 209 from the plurality and proceed to View Strategy Details process 210.

Figure 3:
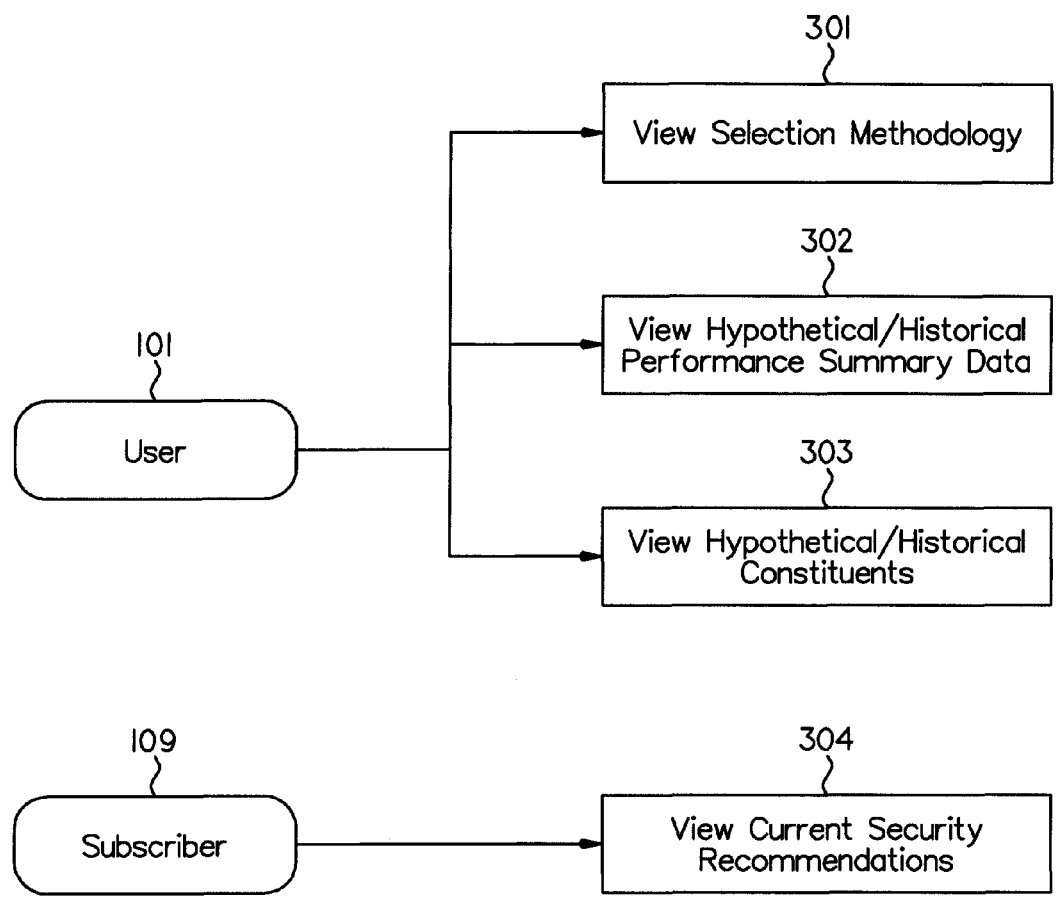
FIG. 3 is a flowchart illustrating aspects of the present invention.

This View Strategy Details process is highlighted in FIG. 3. The user 101 sees numerous aspects of the strategy she selected. She may view the selection methodology and related content as part of action 301.

In action 302 she may view various performance statistics, either hypothetical and/or historical related (depending on the strategy's methodology and time since creation) related to this strategy. For various durations (1 year, 3 year, 5 years, etc) and various seasonalities (invest in January, February, etc) the user 101 may see a strategy's average annual return, standard deviation, Sharpe ratio, worst performance over a time subset (1 month, 1 year, 3 years, etc) of a chosen duration (for example, a user 101 could see, for the most recent 10 years, the worst three-year rolling average performance), best performance over a time subset (1 month, 1 year, 3 years, etc) of her chosen duration, percentage of time subsets (1 month, 1 year, 3 years, etc.) of her chosen duration in which the strategy returned a negative performance (or alternately a performance less than a desired amount).

In addition to the values listed above, she may also compare the strategy at various durations and seasonalities to a plurality of benchmarks and indexes. In doing so she may see the strategy's worst underperformance relative to a benchmark over a time subset (1 month, 1 year, 3 years, etc) of her chosen duration, percentage of time subsets (1 month, 1 year, 3 years, etc) of her chosen duration in which the strategy under-performed a chosen benchmark (i.e.: a user 101 could see for the most recent 20 years starting in January, the percentage of rolling three-year time periods in that 20 year time period in which the strategy under-performed a given benchmark), and correlation of the strategy to the benchmark. Where appropriate, these figures could alternatively be expressed to show the percentage of time in which a strategy failed to beat a benchmark by a given amount. Alternatively, this action could also show statistical measures such as R-squared, t-statistics, p-values, and similar measures. For all of the above items available as part of action 302, these statistics may be seen on a gross basis or net of the costs of subscription to the PMP 103. Alternatively, these figures may be shown net of taxes, given plausible assumptions of tax rates, wash sale constraints and reduction of the portfolio to pay estimated taxes.

In action 303 the user 101 may view hypothetical and/or historical constituents of the strategy that comprise the statistics seen in action 302. The user may drill down to see the hypothetical and/or historical returns of a strategy, compared to a benchmark of her choice. If the user 101 wishes, she may drill down yet again on any of these returns to see the hypothetical/historical constituents that comprised that strategy return. Here the user 101 can see the stocks, their returns and the weight of each stock in the portfolio that combined to yield the return listed. All of these figures will be listed for the plurality of seasonality and duration choices available in action 302.

Figure 4A:
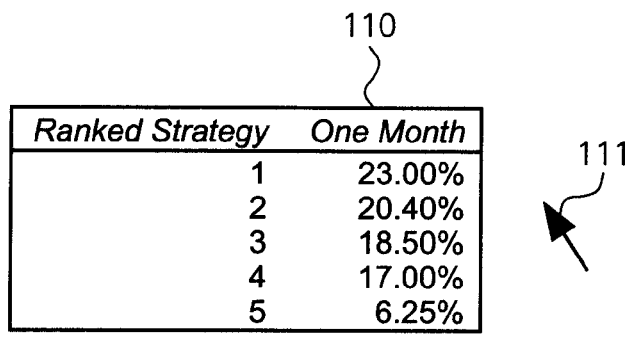
FIGS. 4A, 4B and 4C illustrate what would be shown on a user's screen in the selection of an investment strategy.
Figure 4B:
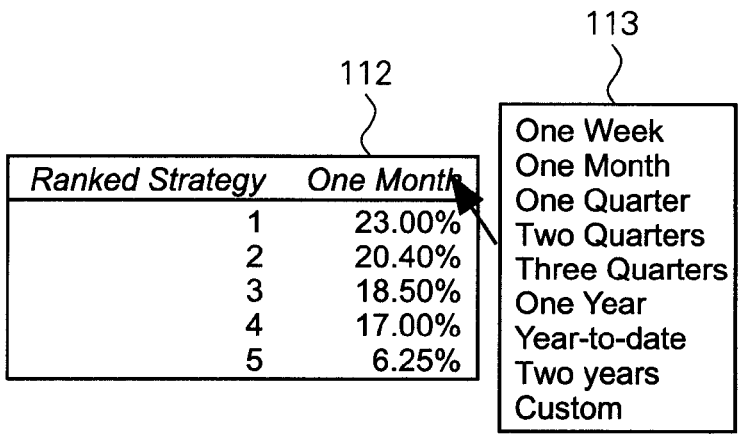
Figure 4C:
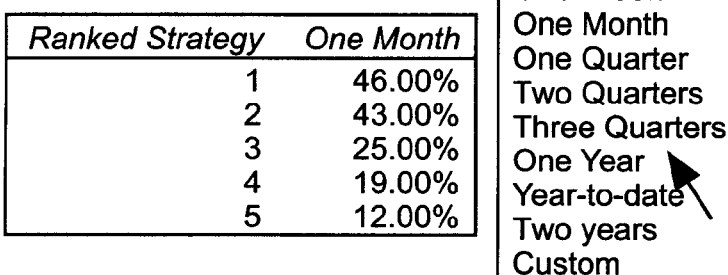

FIGS. 4A through 4C illustrate the kinds of things a user 101 could view if he connects to the PMP computer 103 as he investigates the available strategies. FIGS. 4A though 4C illustrate some examples of 'drill down' menus as a 'performance-based' investor might. The 'performance-based' investor is interested mainly in the returns, and not necessarily interested in either a lot of theory or 'hand-holding.' At another point, the path taken by the newer investor is explored.

Referring now to FIG. 4A, a screen area 110 and mouse pointer 111 are shown. Screen area 110 shows the ranking of strategies so a 'performance-based' investor can see how different strategies have been ranked based on their past performance. In screen area 110, we can see that the best-performing strategy for a one-month period was 23.00% and the fifth-best performing strategy returned 6.25% for the same period. FIG. 4B shows the mouse pointer 111 pointing at the duration area 112 of screen area 110. A pop-up menu 113 appears at the user signal (usually a mouse click, but alternatively implemented as a 'mouseover' event without a click).

An example of a 'mouseover' event can be seen in Microsoft Word 2000 and similar programs when one places the mouse pointer over a button on the toolbar. Pointing at the "diskette" button for a few seconds causes the words "Save (CTRL+S)" to appear on the screen. All menus and controls are capable of being executed as standard mouse-click, secondary mouse-button click, or mouseover events as desired. The preferred embodiments use mouseover events for many of the 'drill-down' menu choices.

As shown in FIG. 4C, when the user moves the mouse to pop-up menu 113 and selects a different duration (one year), the data appearing in screen area 110 changes to reflect the returns on those strategies.

The user, settling on one-year as the duration of interest, may then investigate what strategies performed to what levels. Referring now to FIG. 5A, the mouse pointer 111 points at the second strategy in the list. A strategy-name pop-up menu 201 appears to the right showing that the second strategy in the list is named "Index Plus A." Referring now to FIG. 5B, the user slides the mouse pointer 101 to the right over a portion of strategy-name pop-up menu 201 and is rewarded with a strategy-description pop-up menu 202. Referring to FIG. 5C, the user slides the mouse pointer 101 to the right over a sample-holdings screen portion 203, and a sample-holdings pop-up menu 204 appears. The sample-holdings pop-up menu 204 indicates a sample of the type of securities purchased in accordance with that strategy.

Figure 5D:
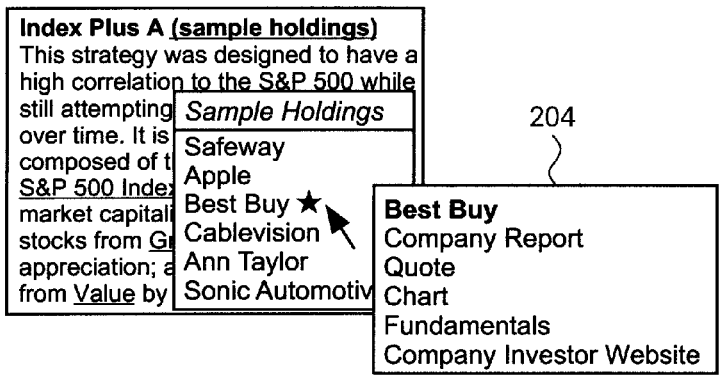

Referring now to FIG. 5D, the sample-holdings pop-up menu 204 lists the stock "Best Buy" with a star. The star is optionally used to indicate stocks whose companies have paid a sponsorship fee for allowing a link to information about the company, such as "Message from Best Buy to potential investors."

Figure 5E:
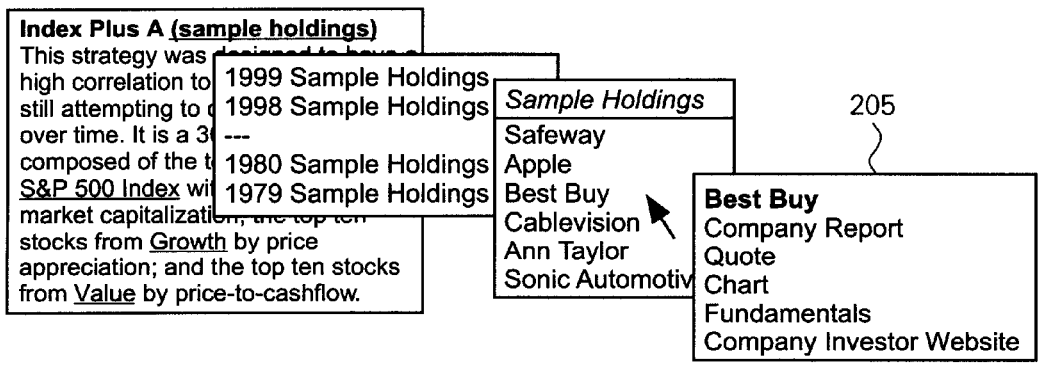

Referring now to FIG. 5E, an alternate menu 205 allows the user a choice of what year they would like to see a sample-holdings pop-up menu.

Figure 6A:
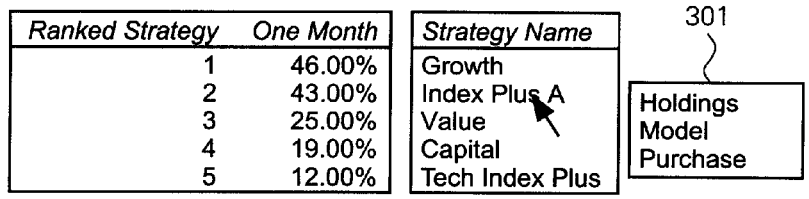
Figure 6B:
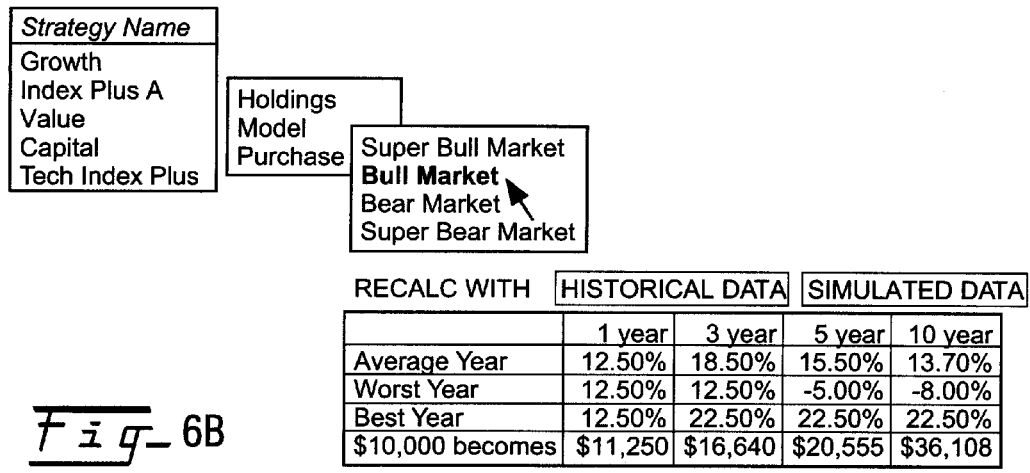

Referring now to FIG. 6A, an alternate drill-down menu 301 appears when the user clicks on the strategy name. The user is presented with a choice to explore holdings, model the portfolio under various market conditions, or purchase the stocks in accordance with the strategy. FIG. 6B shows a 'drill-down' through the model selection to the bull market selection. The user is either presented with random data based on the standard deviations of each of the holdings in each of the strategies or is provided with data similar to the 40-year historical results of that individual strategy. For example, in the bull market the best return was 12.50% for one year, with a 10-year best year of 22.50%. This allows the user to see what typical returns might be with this strategy and allows them to better gauge their own risk tolerance.

Figure 6C:
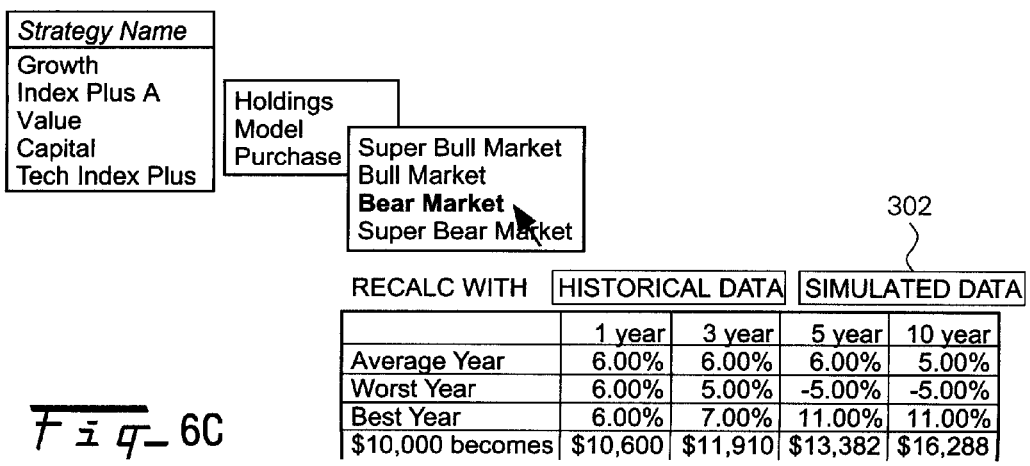

FIG. 6C shows a typical bear market results. Super-bull and super-bear would present even wilder swings to the good and bad as appropriate. The user can re-calculate additional iterations of bull or bear markets by clicking in simulated data area 302. Referring to FIG. 6D, if the user wishes instead to see how the strategy would have performed based exclusively the underlying historical data, the user can click in the historical data area 303.

In an embodiment shown in FIG. 6E, the choices for the modeling include a "sideways" or doldrums market, in addition to super-bull, bull, bear, and super-bear markets.

Referring now to FIG. 7, the user (having reviewed alternative strategies as desired) clicks on purchase in alternate drill-down menu 301.

Figure 8:
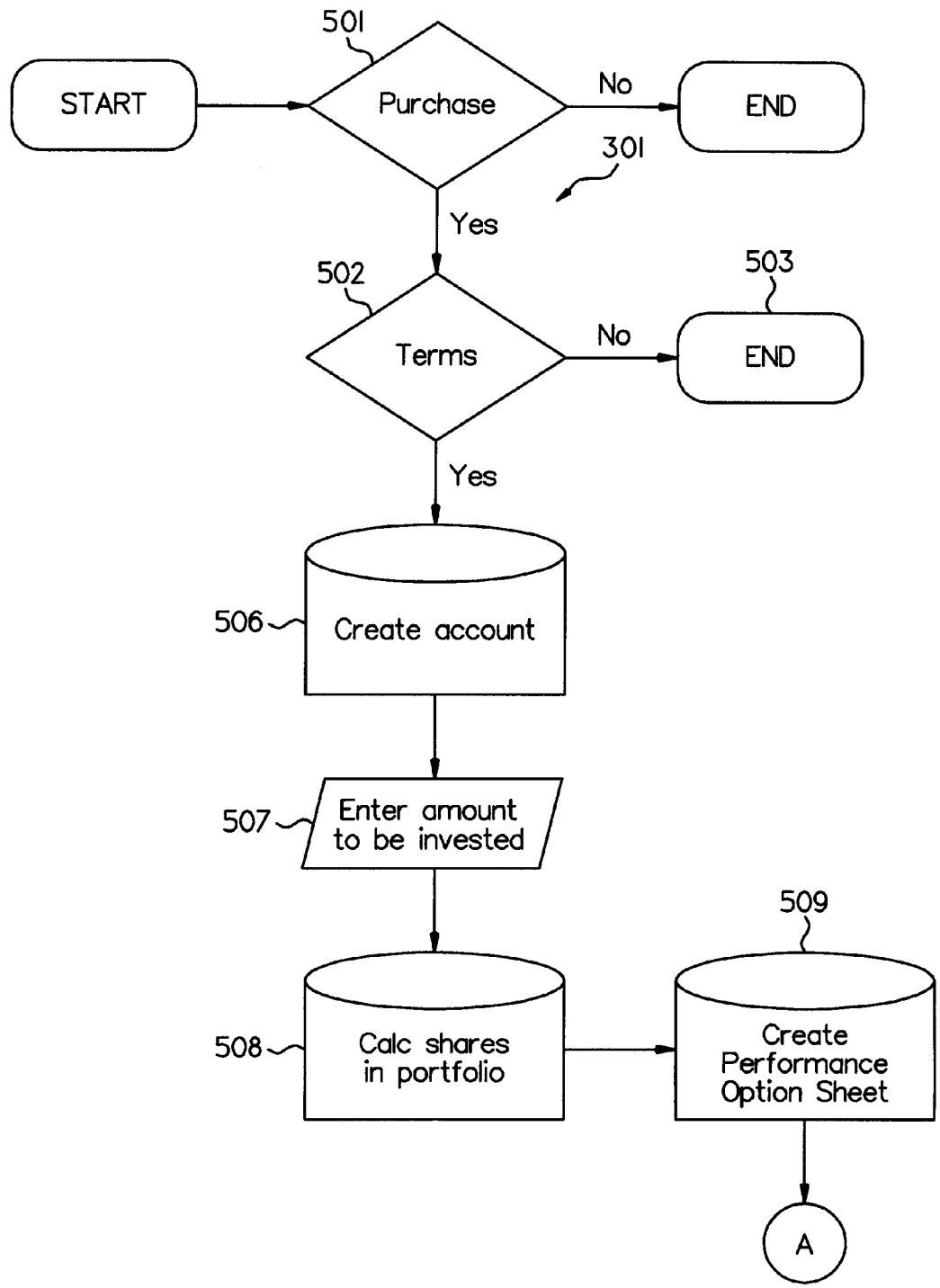
FIGS. 8, 9, 10 and 11, respectively, are flowcharts illustrating aspects of the present invention.

FIG. 8 refers to the purchase process of a preferred embodiment of the present invention. The user decides whether to make a purchase or not at block 501. If the user indicates that he would like to make a purchase, he decides whether or not to accept terms at block 502. Terms include all of the legal disclaimers that desirably should be in place regarding trading securities in this fashion.

In the event that the user decides not to make a purchase at block 501 or decides to decline the terms at block 502, that results in the end 503. End 503 alternately includes sending the user to a new page containing a message about required terms, returns the user to the start page, or returns the user to his exploration of various strategies.

If the user accepts terms at block 502, including all appropriate financial eligibility (e.g. credit card or other information regarding payment), then a user account is created at block 506. Once the user account has been created, the user is prompted to indicate the amount that the user would like to invest. The amount invested is debited by a first fee and also by a second fee. The first fee is paid to the company generating the information to the user. The second fee is paid by an independent broker depending on the arrangement between the company and the user.

For example, if the user decides to invest $100,000 and the first fee is $29.95 and the second fee is $14.95, then the PMP subtracts those fees to get $99,955.10. This number is divided by the number of stocks in the folio. For example, if there are 20 stocks in the folio, $4997.75 is allocated per stock in the strategy. If the market is open, real-time pricing is preferably used to generate how the 'at-market' portfolio looks on a proposed portfolio sheet. The amount that the user decides to invest is then used to help create a proposed portfolio sheet at block 507.

Figure 9:
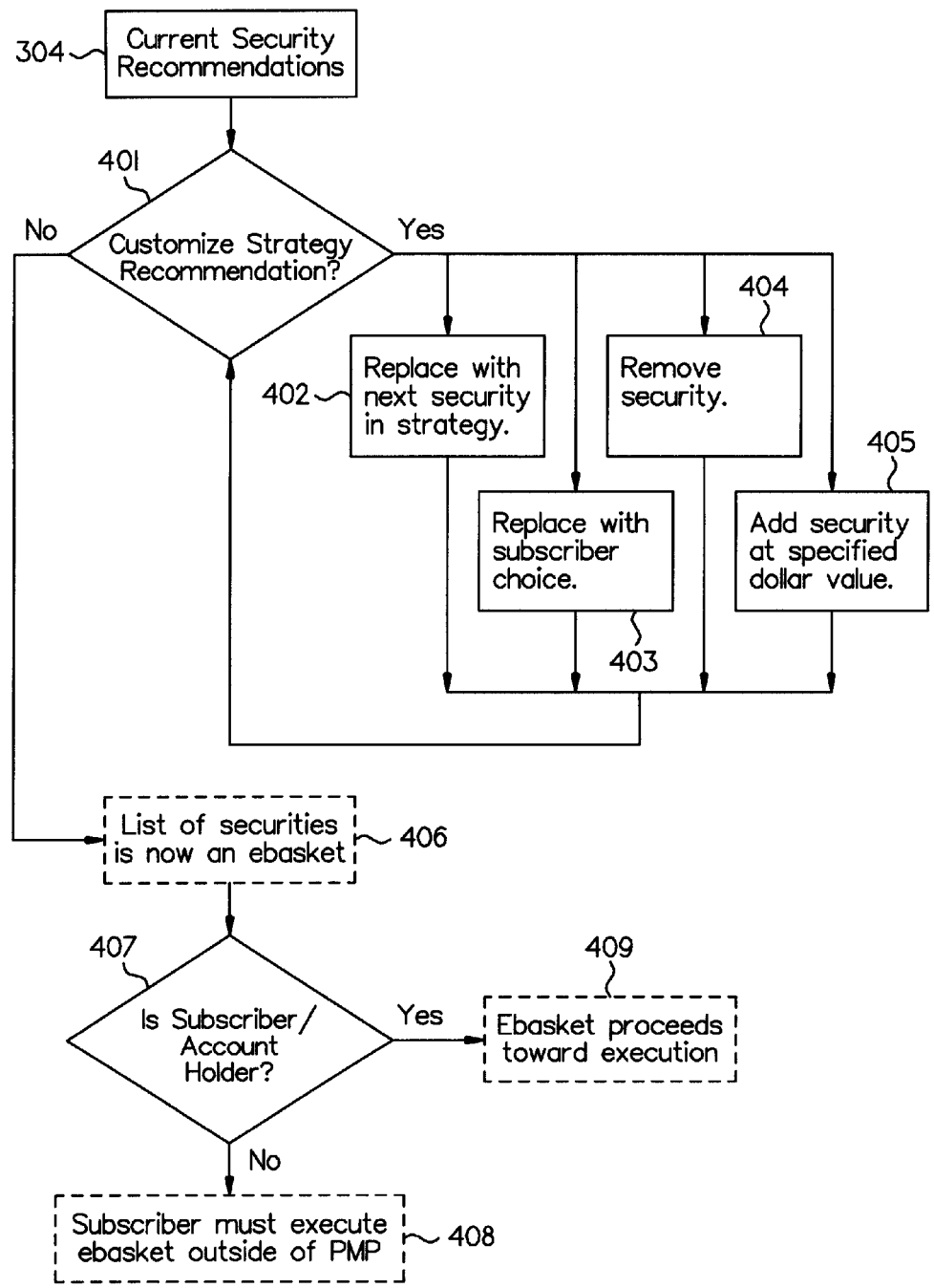

Subscribers 109 (see FIG. 1C) may also view the current security recommendations of a strategy in action 304 (FIGS. 3 and 9), in addition to the actions granted to actions 301-303. These recommendations come as a result of applying the methodology of the strategy to the universe of stocks declared in the strategy methodology to arrive at a list of securities it recommends for purchase on any given day. While most strategies will update the list as a part of action 304 on each day in which markets are open, some strategies will be designed to create a list of security recommendation less often.

As a part of this list, subscribers 109 will see various aspects of each security in the list of security recommendations including ticker, name, exchange, indicated current price of the security, indicated number of shares to be purchased, and an adjusted indicated market value to be invested each security. The indicated market value to be invested in each stock is determined by the weight of the security in the strategy as determined by the strategy's methodology (i.e.: stocks may be equal weighted or weighted by market capitalization in the portfolio) multiplied by the amount the subscriber 109 indicates to invest in the strategy. The indicated number of shares to be purchased is derived by dividing the indicated market value to be invested by the indicated current price of the security, and rounded to the nearest integer share (subject to the market value of the entire basket not exceeding the indicated amount to be invested by the subscriber 109). This rounding to an integer share amount, when multiplied by the indicated current price causes the rounded indicated market value in each security to be different from the non-rounded indicated market value for each security. As a result the total amount that is indicated to be invested will be slightly less than the total amount indicated by the subscriber 109.

Table 1, below, shows how an abbreviated custom performance sheet looks.

TABLE 1

Abbreviated custom performance sheet

| | Stock | Ticker | Price | Shares | Cost |
|---|---|---|---|---|---|
| 1 | GUESS INC | GES | 12.688 | 394 | $ 4,999.07 |
| 2 | ALCOA | AA | 60.375 | 82 | $ 4,950.75 |
| 3 | SALTON INC | SFP | 49.000 | 102 | $ 4,998.00 |
| ... | | | | | |
| 19 | 3M | MMM | 75.000 | 66 | $ 4,950.00 |
| 20 | IBM | IBM | 125.000 | 40 | $ 5,000.00 |
| | | | | Total | $99,591.29 |

Ideally, the total market value of the shares purchased should approach but not exceed the total amount to be invested. Given the data from Table 1, it appears that some $363 remains uninvested from the original $99,955. That is partly due to rounding problems. Rounding the number of shares purchased to the nearest whole number more often will create the problem of purchasing too much stock than some other method of rounding. O'Shaughnessy believes that some other method of rounding may suffice to mitigate this problem. Alternately, other methods used in the art may be employed to create the balanced portfolio without purchasing too many shares and without leaving too much money uninvested.

Alternatively, the PMP 103 could employ a method for fractional share purchases that would negate the need for such rounding as well as any difference between the indicated amount to be invested as compared to the amount declared by the subscriber 109.

At this point, the subscriber 109 has the opportunity to customize the list of current security recommendations 304 that came as a result of applying the strategy recommendation 206 to the current universe of stocks. This customization is highlighted in FIG. 9. Given the current security recommendations 304, the subscriber 109 may either customize the list of security recommendations 205 or proceed with the basket as is. This is decision 401.

If she chooses to customize the list, she again has several options. If the subscriber 109 does not want to invest in one of the listed securities (for instance, she is a socially responsible investor and does not with to invest in, e.g. Philip Morris, a tobacco company) she may elect option 402 and have a security removed and replaced by the PMP 103 with the stock which provides the next best fit as deemed by the strategy recommendation 206/209.

Table 2 is a proposed portfolio sheet prior to customization.

TABLE 2

Proposed portfolio sheet.

| | Stock | Ticker |
|---|---|---|
| 1 | GUESS INC | GES |
| 2 | ALCOA | AA |
| 3 | SALTON INC | SFP |
| ... | | |
| 19 | 3M | MMM |
| 20 | PHILIP MORRIS | MO |

Table 3 is a proposed portfolio sheet after the Philip Morris stock (stock no. 20) in the example above is replaced by the stock which provides the next best fit for the subject strategy, IBM in this example.

TABLE 3

User-revised proposed portfolio sheet.

| | Stock | Ticker |
|---|---|---|
| 1 | GUESS INC | GES |
| 2 | ALCOA | AA |
| 3 | SALTON INC | SFP |
| ... | | |
| 19 | 3M | MMM |
| 20 | IBM | IBM |

The proposed portfolio sheet is optionally modified to show such factors as market capitalization, industry, and other relevant columns of information to assist the buyer in the decision to 'pull the trigger.' Also, minimum, maximum, average and median market capitalization, share price, and other factors optionally are displayed as part of the summary of the proposed portfolio.

Second, the subscriber 109 may elect option 403 in which she removes members of the security recommendations 304 as deemed by the strategy recommendation 206/209 and replaces them with securities of her own choosing. Third, the subscriber 109 may elect to action 404 to remove any member of the security recommendations 304 without replacement, thus concentrating the portfolio. The subscriber 109 may also elect action 405 and add a stock of her own to the security recommendations without removal of any security in the recommendation. Any action 402-405 will cause the PMP to display, and record agreement to, disclosure pertaining to how customization may alter the characteristics of strategy performance she saw in action 302.

Once customizations 402 to 405 are complete or the subscriber 109 chooses not to customize 401, the resulting group of securities becomes an ebasket 406 ready to transmit to a qualified broker. The PMP must now validate the subscriber 109 as being a subscriber/account holder 114 to proceed with execution of the securities. This evaluation 407 was detailed in FIG. 1B. If the subscriber 109 is not also a subscriber and account holder 111, then the subscriber 109 may copy the contents of the ebasket 406 and execute them outside of the PMP 103 as seen in terminal state 408.

Figure 10:
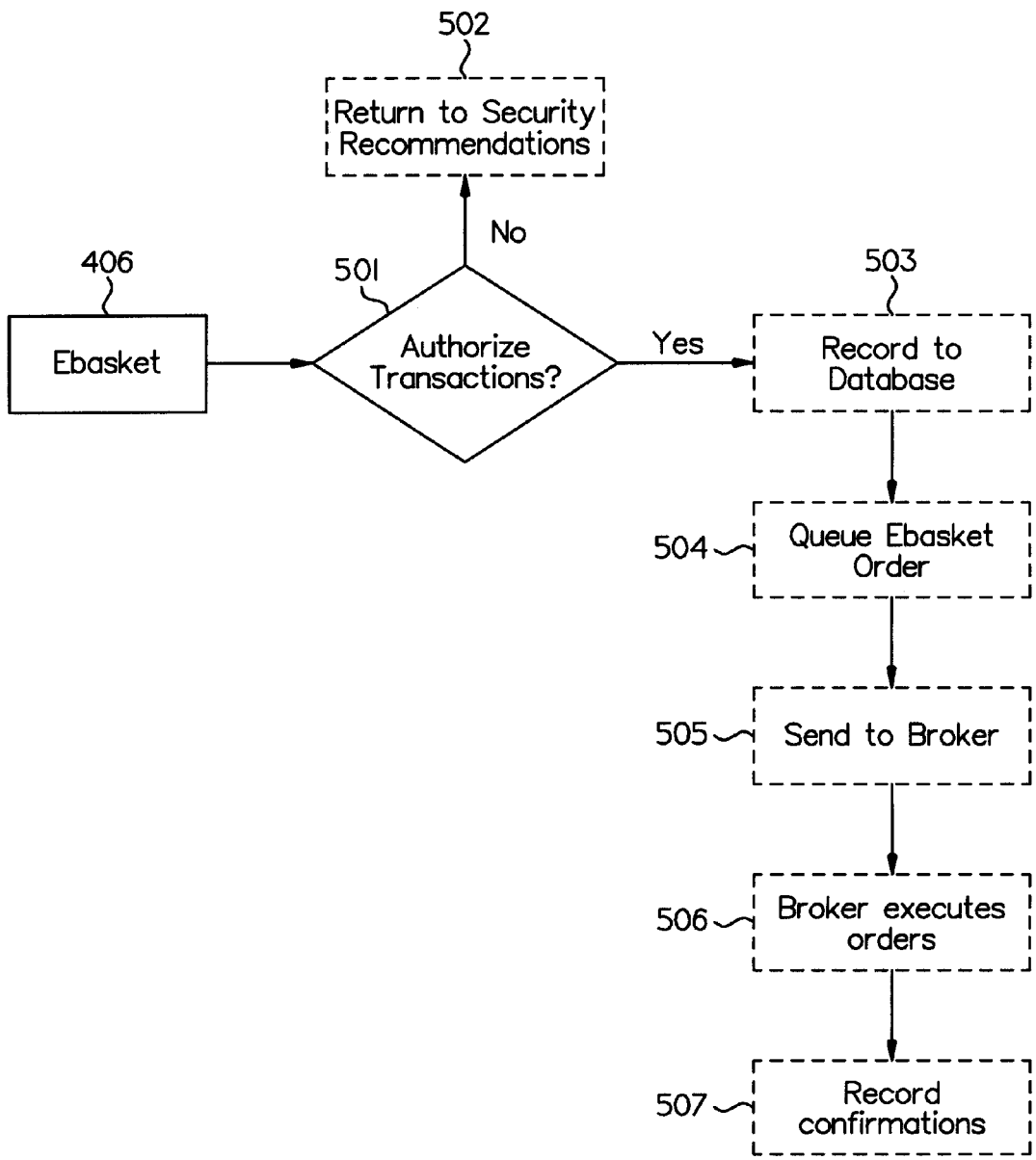

If the subscriber 109 is also a subscriber and account holder 114, execution will proceed as indicated in state 409, which is detailed in FIG. 10. The subscriber/account holder 114 must authorize the list of transactions that result from execution of the ebasket 406 as listed in decision 501. A particular aspect of an ebasket is that the subscriber/account holder 114 is simultaneously authorizing the transaction of multiple securities, as opposed to trading them individually. Upon authorization the PMP will perform multiple individual transactions on behalf of the subscriber/account holder 114. If the subscriber/account holder 114 does not authorize the transactions, the process ends at point 502.

If authorization is given in 501, the PMP 103 records this in addition to the desired transactions in its database 503, and subsequently queues an order for the transactions with the broker in action 504. In a simplified representation, the broker receives the orders 505 and executes them in action 506. The PMP 103 receives confirmations of executions from the broker 104 in action 507. The PMP 103 will notify the subscriber/account holder of execution and confirmation. Alternatively, as shown in FIG. 1B, the Trading Services broker 2004 may provide reporting 2009 to the customer 2001.

Figure 11:
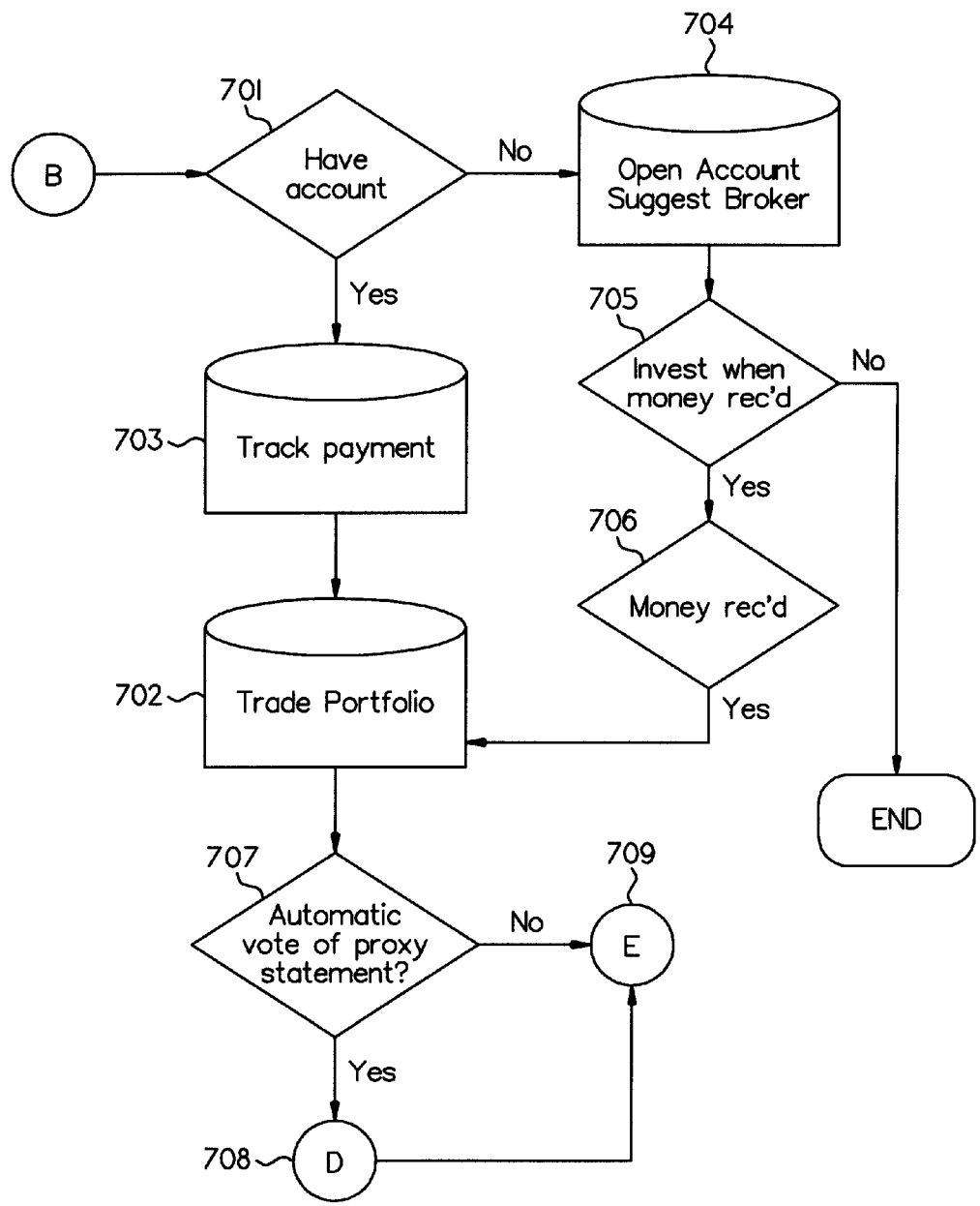

Another embodiment for the execution of the portfolio purchased is described in FIG. 11. Once the user has finalized the selections, the user is asked whether she has an account at an online broker at block 701. Assuming that she does have an account at an online broker, the PMP places a buy order, which is triggered by the user's action at block 702. This preferably happens in real-time. Once the trade has been executed, a custom performance sheet is generated to indicate that the transaction has been completed. After the account has been created at block 701, a first fee is optionally paid from the broker to the operator of the present invention when a portfolio trade takes place at block 702. Since the broker already has the user as a client, the first fee is a pre-negotiated smaller fee than if the user was a new client opening a new account with the broker.

Assuming that the user has no account (or wants to open a new account with a different broker), the PMP suggests one or more brokers. If the PMP is directing the client to a broker, a unique order form for opening the brokerage account is generated, identifying the PMP as the portal through which the new client was generated so that the broker will agree when the user clicks through, to pay pre-specified amount of money to PMP for the placement of a new client.

When the PMP is listing the brokers, the PMP preferably generates additional revenues by selling 'ad placement' to brokers for prospective clients. Depending on the placement, frequency, and prominence of the listing, the broker may pay a higher or lower fee. For example, if E-Trade wished to be listed at the top of the list each time (alternately some percentage of the time) a customer was suggested a choice of brokers, E-Trade would pay a certain price for that privilege. Similarly, if E-Trade wished to be listed as the only broker with a 'banner ad,' they would pay a certain price for that privilege. Alternately, the PMP is optionally set up to present the brokerages in order of customer-satisfaction, low cost, or other schemes as marketing gurus might deem prudent. In any event, a larger pre-negotiated fee is paid from the broker to the operator of the invention. For example, since many online brokerages have expenses that are about $200 to $400 for each new account, a pre-negotiated fee of $100-300 is preferable. As market conditions change, however, these numbers will vary accordingly. Also, to develop market share and 'buy in' from the brokers lower fees may be charged to the brokers in accordance with the present invention.

Once the account is opened at a new broker at block 704, the user is queried at block 705 whether they want their money automatically invested when it is received by the broker. This is important because it may take a little while for the user's money to be made available to the broker since it may be sitting in a money market or since it may take a day or two for a bank transfer to be effective. If the user declines to take that option at block 705, it is preferred that the user's chosen proposed portfolio is saved so that the user can return to authorize the trade once the money arrives at the broker. In a preferred embodiment, when the money is available to the broker an email notification is generated so that the user is informed that the funds are available for investment.

If the user does opt to have the money automatically invested at block 705, then when the money is received at block 706, the portfolio is purchased at block 702 as previously discussed.

Anyone who has ever owned stock knows that the mailed proxy statement can generate an annoying amount of paperwork in which many investors are not at all interested. The individual investor, now easily capable of owning two to four portfolios of twenty stocks each, might be literally buried in documents generated by those publicly traded companies. It is a feature of the present invention to offer to the user the choice of whether or not they would like an automatic vote of their proxy. This would ensure a) their proxy was used to vote and b) they would not be on the receiving end of the time-consuming paperwork generated by their holdings.

Referring to Table 1, in a preferred embodiment, the custom performance sheet ties in with quote data (preferably real-time, but alternately delayed) to show the user the present performance of the portfolio. The abbreviated custom performance sheet is optionally modified (by default and/or by a user) to show such factors as market capitalization, industry, and other relevant columns of information. Also, minimum, maximum, average and median market capitalization, share price, and other factors are optionally displayed as part of the summary of the portfolio. It is preferred that the user be able to customize the order of the stocks, presentation of underlying factors (e.g. earnings estimates, price-to-cashflow, market capitalization), as well as being able to sort on any of the underlying factors.

Figure 13:
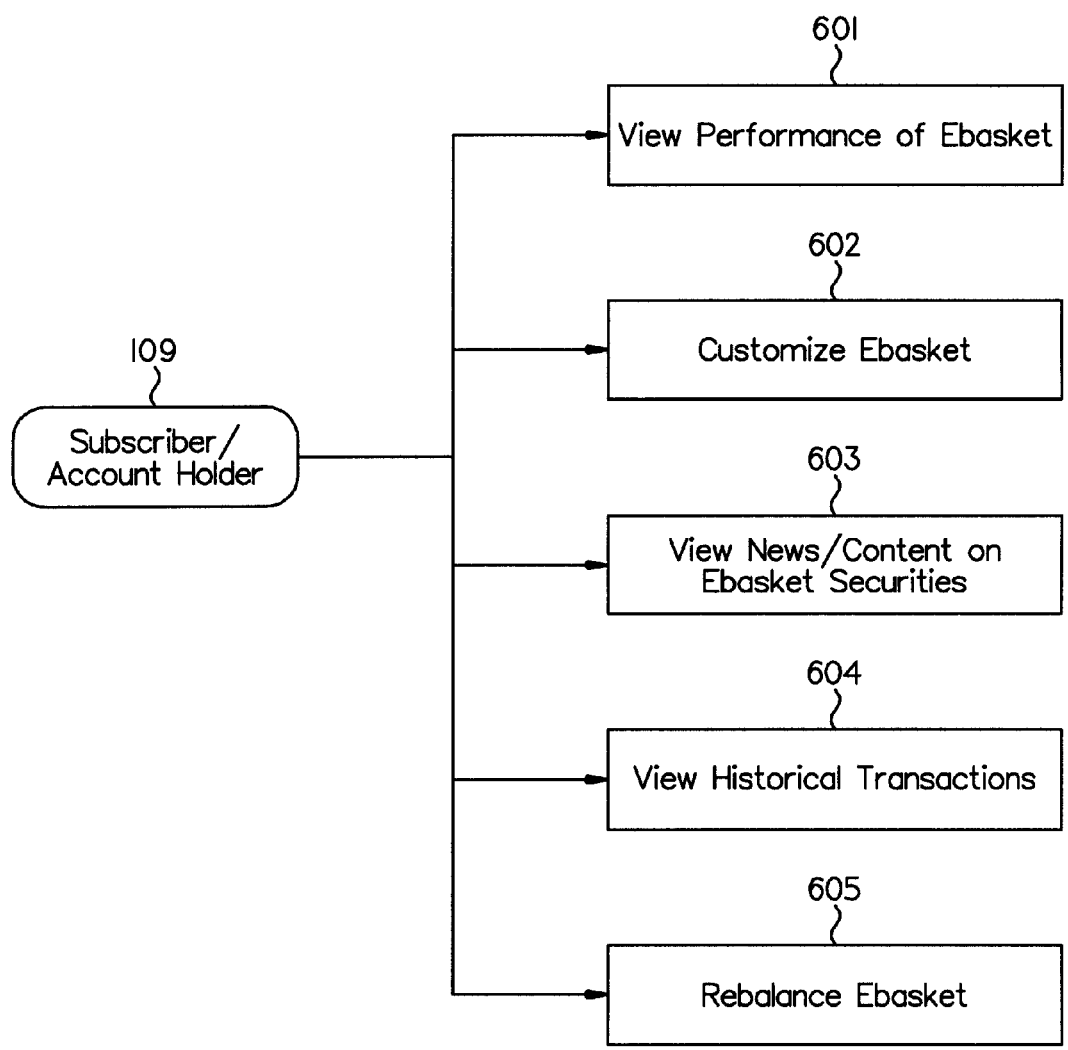
FIG. 13 is a representation of the options available to a user when communicating with the PMP computer.

The subscriber/account holder 114 will see that results of the actions in FIG. 10 from looking at an account maintenance section that is illustrated by block diagram in FIG. 13. In this area the subscriber/account holder 114 may see various aspects of their investments with a qualified broker 104 that have been facilitated through the PMP 103. The subscriber/account holder 114 may view the performance of her investments as a part of action 601. Here the subscriber/account holder 114 may view either the performance of any ebasket 406 as a result of the strategy recommendation 206 in which she invested or may drill down to see them on an individual security level. The subscriber/account holder 114 will be able to see identifiers such as ticker and company name as well as split adjusted purchase price, split adjusted shares held, split adjusted beginning market value, current price, current market value, dollar gain/loss, and percentage gain/loss over a variety of time periods including year to date, 1 month, 3 months, 6 months, 1 year, since inception. In addition to a tabular format, the subscriber/account holder 114 may view a graphical representation of the performance of ebasket 406 against a variety of benchmarks, over a variety of time periods (including year to date, 1 month, 3 months, 6 months, 1 year, since inception).

It should be recalled that the security recommendations 304 come as a result of applying the strategy recommendation 206 to the current universe of securities, and that from FIG. 2 the strategy recommendation only covered one aspect of an allocation recommendation 203 for those who desired the PMP 103 to provide a recommendation. Any investment in cash or fixed income will also be listed in this performance section 601.

Alternatively, the subscriber/account holder 114 may create views or custom groupings of ebasktets 406 or individual securities and may see performance history on them, where applicable.

Subscriber/account holders 114 may also customize the members of any held list of security recommendations 304 by selling individual stocks or adding to the basket after purchase. This is done as part of action 602, and purchases and sales are transacted on an individual security level, as opposed to the purchase of an ebasket 406 where the subscriber/account holder 114 authorizes the purchase of multiple securities simultaneously.

The subscriber/account holder 114 may also view news and other content related to any of the securities they own or the market in general in action 603. Alternatively, they could also review content on any stock placed in a "watch list" to observe that they have not yet purchased.

The subscriber/account holder 114 may also view a list of historical transactions in action 604 which will detail all transaction related information over a time specified by subscriber/account holder 114.

Figure 12A:
Figure 12B:

FIGS. 12A, 12B and 12C are examples of screens that would be seen in this way by customers of Netfolio, Inc.

Figure 14:
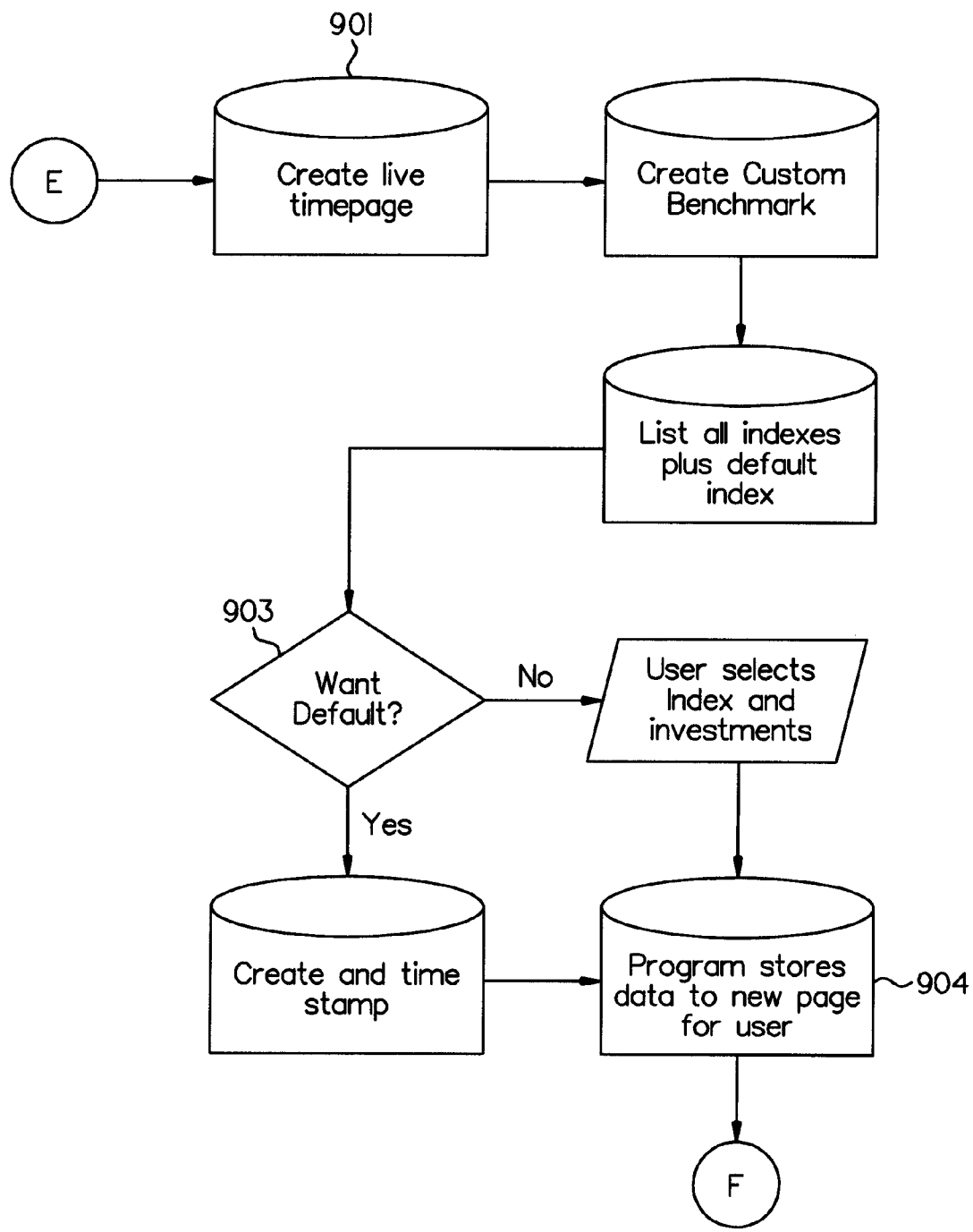
FIG. 14 is a flowchart illustrating aspects of the present invention.

Referring now to FIG. 14, at block 901 the live timepage is created for that individual user that notes what investments were made and where. The timepage is preferably customizable by the user to show different fields and allows the user to sort based on performance, market value, or other factors displayed onscreen.

An example timepage appears in Table 4.

TABLE 4

Sample timepage
Today's date: Aug. 14, 1999
Portfolio Purchased: Jul. 20, 1999

|    | Stock      | Ticker | Price Now | Shares | Market Value | Gain (Loss) |
|----|------------|--------|-----------|--------|--------------|-------------|
| 1  | GUESS INC  | GES    | 15.000    | 394    | $ 5,910.00   | $   910.93  |
| 2  | ALCOA      | AA     | 75.000    | 82     | $ 6,150.00   | $ 1,199.25  |
| 3  | SALTON INC | SFP    | 45.000    | 102    | $ 4,590.00   | $  (408.00) |
|    | ...        |        |           |        |              |             |
| 19 | 3M         | MMM    | 90.000    | 66     | $ 5,940.00   | $   990.00  |
| 20 | IBM        | IBM    | 144.000   | 40     | $ 5,760.00   | $   760.00  |
|    |            |        |           | Total  | $113,400.00  | $13,808.71  |

The performance of the portfolio can be contrasted against particular indexes, mutual funds or other strategies over time so that the user can see how their portfolio performs against other strategies. It is preferred that the default indices that are presented are keyed into the type of strategy initially selected by the user. For example, a 50% S&P 500 and 50% Growth strategy would have displayed as a default both the S&P 500 and the Growth strategy for comparison. As another example, a Big Cap Value portfolio would be listed with Berra Value and S&P 500 Value for comparison. Referring back to FIG. 14, the user who selects the default at block 903 will have the PMP store the data to a new page for the user at block 904. The storage is preferably done on the remote server, but is optionally stored on the hard drive of the individual user.

If the user prefers, the user may customize the benchmark page to include other information. In the example shown in Table 5, the user's portfolio outperformed all of the other benchmarks except the fictional MELJIM mutual fund.

TABLE 5

Sample benchmark page showing comparisons with indices and mutual funds.
Today's date: Aug. 14, 1999
Portfolio Purchased: Jul. 20, 1999

|    | Stock      | Ticker | Price Now | Shares | Market Value | Gain (Loss)  |      |
|----|------------|--------|-----------|--------|--------------|--------------|------|
| 1  | GUESS INC  | GES    | 15.000    | 394    | $ 5,910.00   | $   910.93   |      |
| 2  | ALCOA      | AA     | 75.000    | 82     | $ 6,150.00   | $ 1,199.25   |      |
| 3  | SALTON INC | SFP    | 45.000    | 102    | $ 4,590.00   | $  (408.00)  |      |
|    | ...        |        |           |        |              |              |      |
| 19 | 3M         | MMM    | 90.000    | 66     | $ 5,940.00   | $   990.00   |      |
| 20 | IBM        | IBM    | 144.000   | 40     | $ 5,760.00   | $   760.00   |      |
|    |            |        | This portfolio |    | $113,400.00  | $13,808.71   |      |
|    |            |        | S&P 500   |        | $103,111.00  | $ 3,519.71   | 292% |
|    |            |        | NASDAQ    |        | $104,999.00  | $ 5,407.71   | 155% |
|    |            |        | GROWTH MF |        | $109,800.00  | $10,208.71   | 35%  |
|    |            |        | MARBRI MF |        | $111,000.00  | $11,408.71   | 21%  |
|    |            |        | MELJIM MF |        | $116,000.00  | $16,408.71   | -16% |

Figure 15:
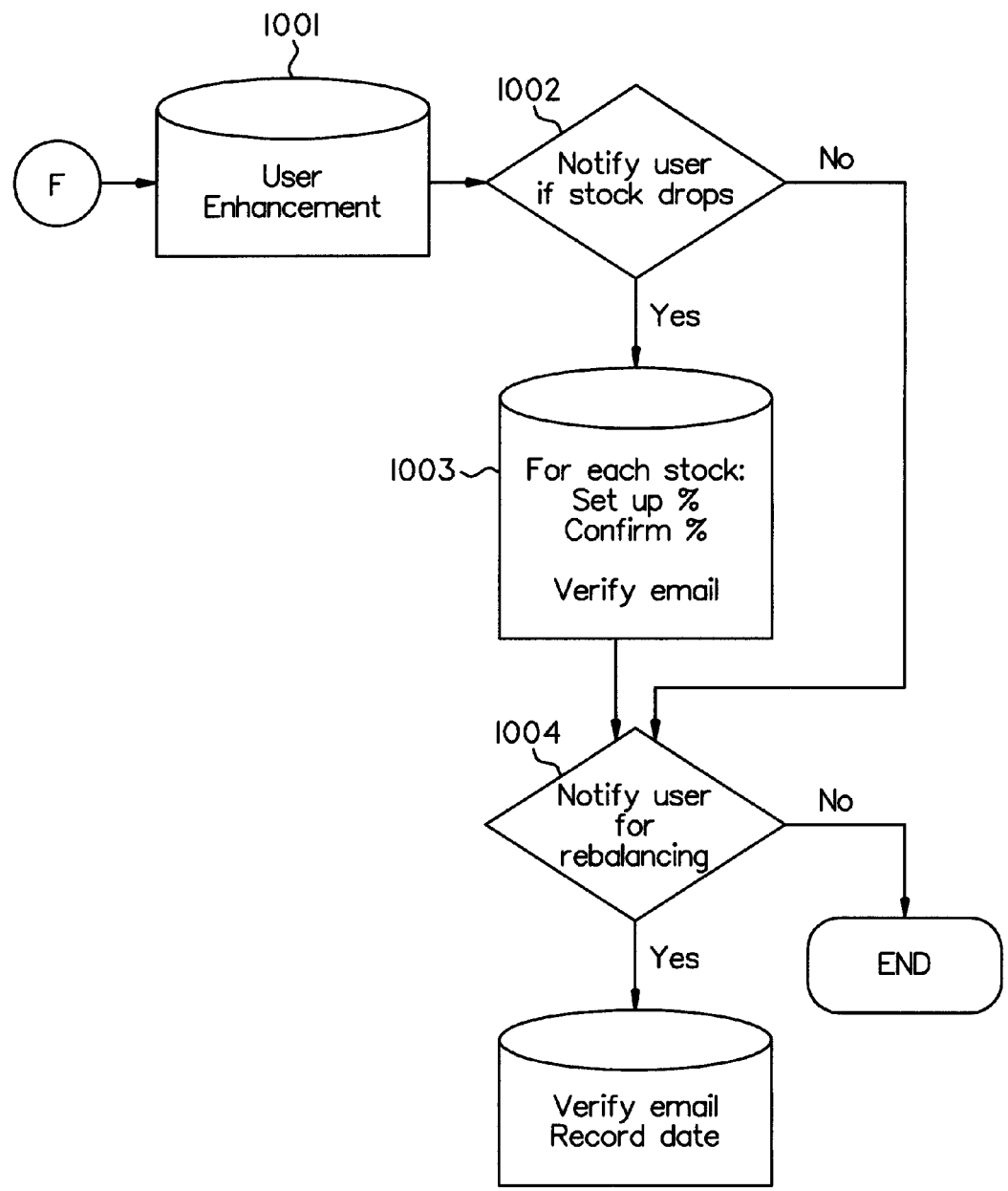
FIG. 15 is a flowchart continuing from FIG. 14, illustrating aspects of the present invention.

Referring now to FIG. 15, the user may further enhance and alter the information presented in the benchmark page in block 1001. Hotlinks to news items or press releases are one example of the type of information that can be added to the benchmark page. Table 6 shows a sample benchmark page showing news.

TABLE 6

Sample benchmark page showing news.
Today's date: Aug. 14, 1999
Portfolio Purchased: Jul. 20, 1999

| FYI  | Stock      | Ticker | Price   | Shares | Market Value | Gain (Loss)  | 4997.75  |
|------|------------|--------|---------|--------|--------------|--------------|----------|
| News | GUESS INC  | GES    | 15.000  | 394    | $ 5,910.00   | $   910.93   | 333.1833 |
| News | ALCOA      | AA     | 75.000  | 82     | $ 6,150.00   | $ 1,199.25   | 66.63667 |
|      | SALTON INC | SFP    | 45.000  | 102    | $ 4,590.00   | $  (408.00)  | 111.0611 |
|      | ...        |        |         |        |              |              |          |
| News | 3M         | MMM    | 90.000  | 66     | $ 5,940.00   | $   990.00   | 55.53056 |
|      | IBM        | IBM    | 144.000 | 40     | $ 5,760.00   | $   760.00   | 34.7066  |
|      |            |        | This portfolio |  | $113,400.00  | $13,808.71   |          |
|      |            |        | S&P 500 |        | $103,111.00  | $ 3,519.71   | 292%     |
|      |            |        | NASDAQ  |        | $104,999.00  | $ 5,407.71   | 155%     |
|      |            |        | GROWTH MF |      | $109,800.00  | $10,208.71   | 35%      |

TABLE 6-continued

Sample benchmark page showing news.
Today's date: Aug. 14, 1999
Portfolio Purchased: Jul. 20, 1999

| FYI | Stock | Ticker | Price | Shares | Market Value | Gain (Loss) | 4997.75 |
|---|---|---|---|---|---|---|---|
| | | MARBRI MF | | | $111,000.00 | $11,408.71 | 21% |
| | | MELJIM MF | | | $116,000.00 | $16,408.71 | −16% |

At any time the user views the sample benchmark page, the user may make changes to it.

Referring to FIG. 15 at block 1002, a user is preferably queried about whether or not the user would like email notification if any stock drops. The user is given the option to select one or more stocks and to set up a percentage drop after which the user would like to be notified. For example, the user may decide that he wants to be notified if ALCOA drops more than 5%, but for IBM and 3M the user has more tolerance for volatility and therefore wants to be notified in the event of a 10% drop. After confirming each of the percentages for each stock, the PMP thereafter verifies the user's email address at block 1003.

Lastly, the subscriber/account holder 114 may elect to rebalance his list of security recommendations 304 for a particular strategy recommendation 206 in action 605. Rebalancing is the process of periodically reviewing a subscriber/account holder's ebasket 406 and renewing its contents not only to the current list of security recommendations 304 at the time of rebalance, but also re-weighting them in the manner proscribed by the strategy recommendation 206/209 from which it is based, but also re-weighting them in the manner proscribed by the strategy methodology 301. This rebalancing is an aspect of the strategy's methodology, and all performance information 302 regarding the strategy recommendation 206 requires rebalancing at a specified interval of time (usually one year).

Figure 16A:
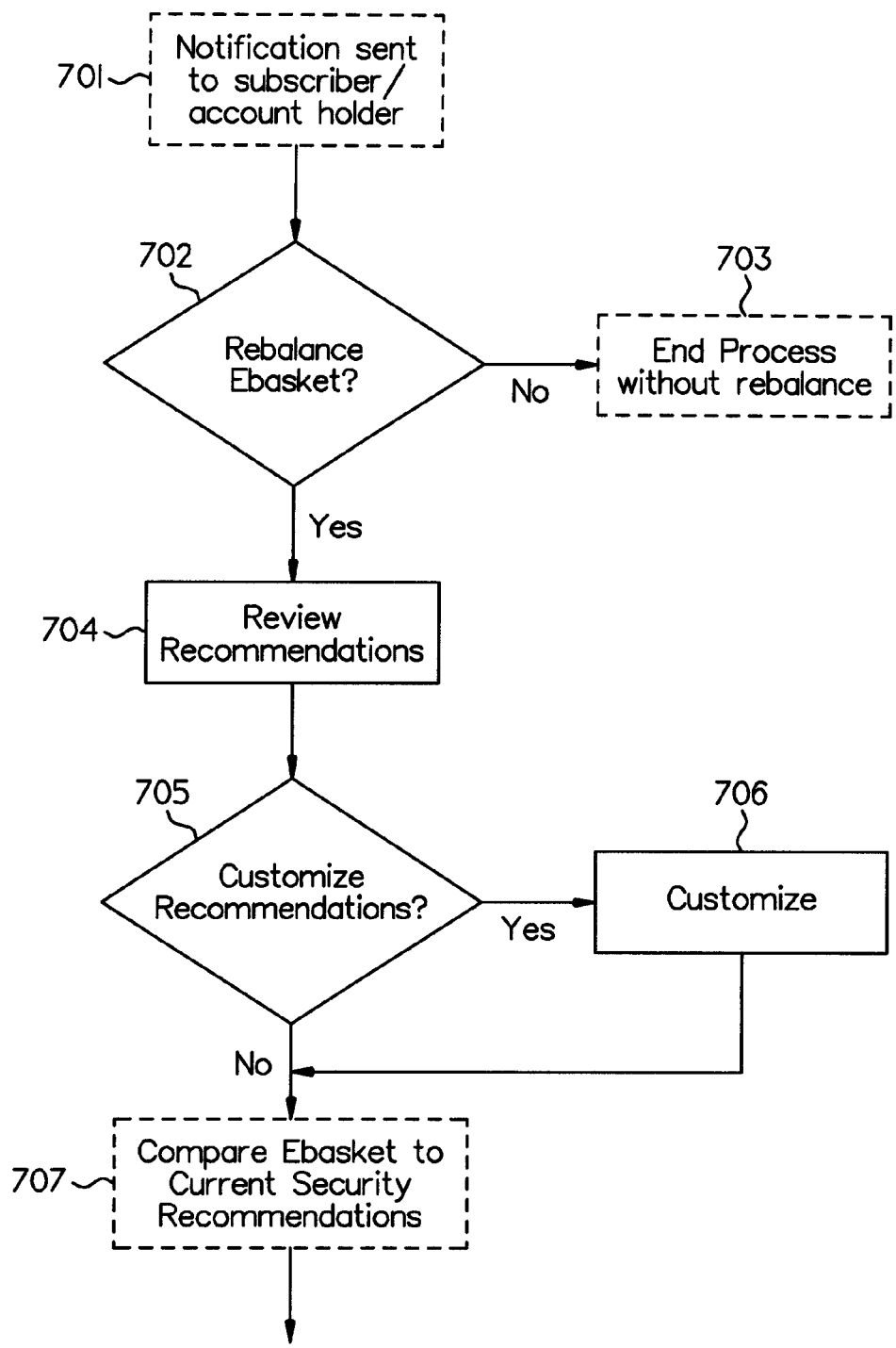
FIG. 16A is a flowchart illustrating aspects of the present invention.
Figure 16B:
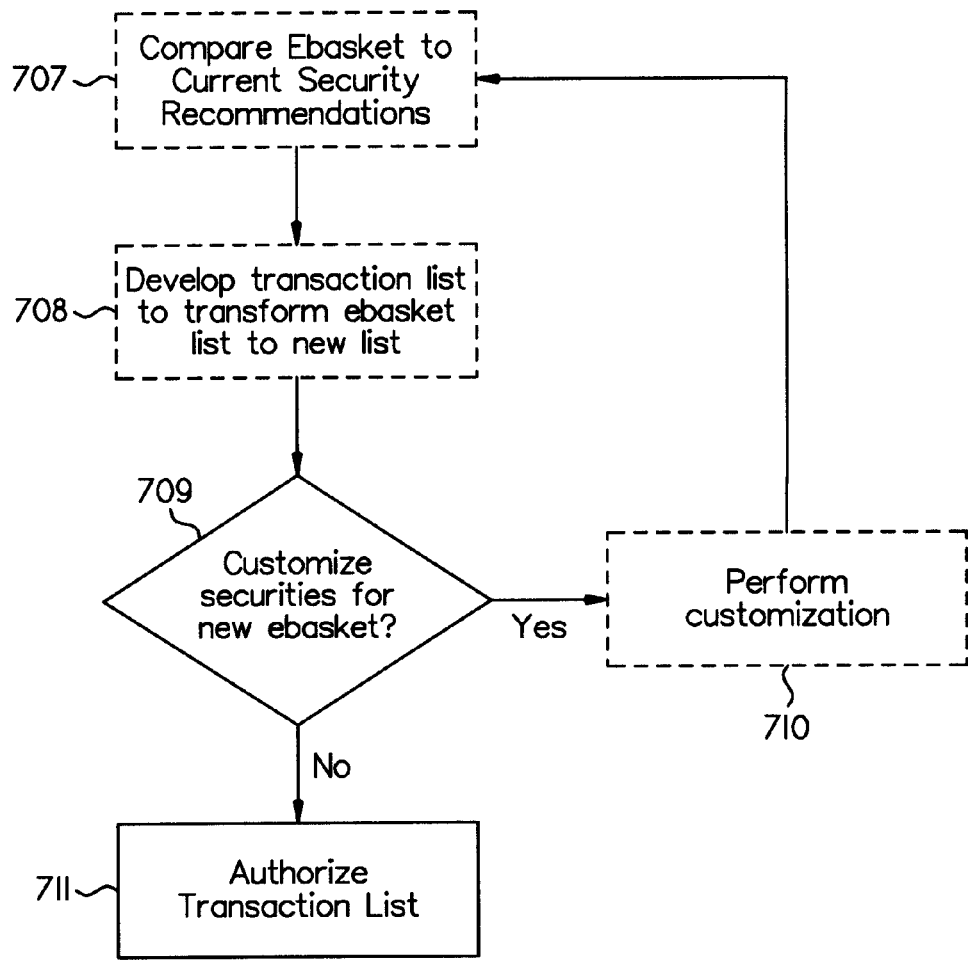
FIG. 16B is a flowchart continuing from FIG. 16A, illustrating aspects of the present invention.

This process is detailed in FIGS. 16A and 16B. The PMP 103 will send notification 701, preferably by email, to a subscriber/account holder 114 invested in an ebasket 406 derived from a strategy recommendation 206 roughly 2 weeks before her recommended rebalance is due with a reminder of the upcoming event. The notification 701 will recommend the subscriber/account holder 114 to retake the Profiling process 202 if there have been any changes in her life that would alter her financial needs (i.e.: addition to family, lost income, etc.).

At the proper time, the subscriber/account holder 114 must choose whether or not to rebalance the ebasket 406 following a particular strategy recommendation 206 in decision 702. If she elects not to rebalance, the ebasket 406 remains untouched and the rebalancing process ends in state 703.

If the subscriber/account holder 114 elects to rebalance in decision 702, the PMP will then renew/revise recommendations in action 704. Here, the PMP will display a new allocation recommendation 203 based upon the last profile generated by the subscriber/account holder if one exists and asks the subscriber/account holder 114 if she wishes to update her profile. If one does not exist, she will be asked if she wishes to take one, similar to decision 201.

Again, the subscriber/account account holder 114 may customize her allocation recommendation 204 and/or strategy recommendation 206 at decision 705, which is functionally equivalent to decisions 204 and 207. If she chooses to customize either recommendation, the subscriber/account holder repeats steps 205 and 208-209 to customize her recommendations and arrive at a new strategy recommendation 206.

Once the subscriber/account holder 114 has completed customization 706, or if she declined to customize, the PMP 103 will then compare the attributes (securities and the weight of each security in the portfolio) of her existing ebasket 406 (which is the product of applying the strategy recommendation to a market universe sometime in the past) to the attributes of the current security recommendations 304 that are the output of applying the strategy recommendation 206 to current market conditions. This is comparison 707.

As the result of this comparison, the PMP 103 will generate a list of transactions that will transform the existing/old ebasket 406 to the current list of security recommendations 304. This is transaction 708. Hypothetically, DELL resides in the ebasket 406, but has appreciated over the year to the point that its weight in the existing ebasket 406 is 40% of the whole. The current security recommendations 304 as a result of applying the strategy recommendation 206 to the current universe suggests that DELL should remain in the new ebasket but have only a 10% weighting to the whole. The PMP as a result of the comparison 707 will generate a transaction for DELL in action 708 sufficient to reduce its weight in the new ebasket to roughly 10%. In the event that DELL was not recommended by the current security recommendations 304, the PMP 103 would have generated as part of its transaction list 708, sufficient transaction to liquidity the DELL holding in its entirety.

As in places before, the subscriber/account holder 114 has the opportunity to customize the recommended list of transactions 708 that will rebalance the existing ebasket 406 into the new one. This is decision 709, which is equivalent to 401. If the subscriber/account holder 114 elects to customize process 710, which provides her with all options available in actions 402 to 405 upon current list of security recommendations 304. Doing so will cause the PMP to re-enter the compare 707 and develop transactions 708 actions.

When subscriber/account holder 114 has completed all desired customization 710, or if customization was declined at decision 709, the subscriber/account holder 114 must authorize the resulting transaction list 708. This authorization is the same as decision 501, and will restart the process shown in FIG. 10. In the event that the strategy recommendation 206 followed by the subscriber/account holder 114 authorizes a rebalance 702 in accordance with that annual time period, then the PMP will sell all losers on or slightly before the one year anniversary of the purchase of the existing/old list of security recommendations 304 so as to harvest losses (where not negated by wash sale rules) against gains, and will sell the gains at one day after a one-year anniversary of the purchase of the existing/old list of security recommendation 304 so as to achieve the tax benefits of long term capital gains, she will authorize the list of transaction 705 in process 706. This will restart the execution process detailed in FIG. 10.

In the event that the strategy recommendation 206 followed by the subscriber/account holder 114 prescribes an annual rebalance, and the subscriber/account holder 114 authorizes a rebalance 702 in accordance with that annual time period, then the PMP will sell all losers. The stock being replaced preferably is sold at a time when it might achieve the best tax advantage. For instance, loser stocks may be sold on or slightly before the one-year anniversary of the purchase of the existing/old list of security recommendations 304 so as to harvest losses against gains (where not negated by wash sale rules). Also, stocks that gained may be sold one day after a one-year anniversary of the purchase of the exiting/old list of security recommendation 304 so as to achieve the tax benefits of long term capital gains.

In another preferred embodiment, in FIG. 15 at block 1004, the user is queried whether he would like to receive notification about rebalancing their portfolio.

It is contemplated as part of the present invention that the owner of the PMP may optionally be enabled as an online broker. In that instance, the online broker functions would not be distributed across multiple entities. The user would connect to the Internet and then connect directly to the PMP owner-broker. Even when the PMP owner-broker has the capabilities to do the trades, there may still be advantages to allowing a user with an account at a different online broker with whom they are comfortable (or for simplified accounting and money management) to keep their funds in that other online broker.

It is contemplated by the present invention for the user to individually review each of the component strategies available at PMP and create out of such strategies his own unique portfolio in which he decides to invest after reviewing the historical performance data from PMP's database. For example, a sophisticated investor may decide to make a composite custom portfolio based on the top 5 stocks from each of 3 different strategies. Table 7 illustrates the choices.

TABLE 7

Top 5 Stocks from Growth, Index A, Tech Index Plus.

| GROWTH | INDEX A | TECH INDEX PLUS |
|--------|---------|-----------------|
| WMT    | MO      | MSFT            |
| MSFT   | DD      | DELL            |
| T      | F       | CSCO            |
| HD     | FTU     | CREE            |
| BBY    | X       | LU              |

The investor decides to 'tweak' the choices a bit. MSFT (Microsoft) appears in two columns and would be 'double-weighted' in this portfolio. Since the investor already has some Microsoft stock, he eliminates it from the Tech Index Plus in favor of the sixth stock in that strategy, IBM (IBM). The investor looks at the Index A which includes Phillip Morris (MO), Dupont (DD), Ford (F), First Union (FTU), and U.S. Steel (X). The investor dislikes U.S. Steel (X) and eliminates that stock in favor of Merck (MRK). See Table 8.

TABLE 8

Top 5 Stocks from Growth, Index A, Tech Index Plus.

| GROWTH | INDEX A | TECH INDEX PLUS |
|--------|---------|-----------------|
| WMT    | MO      | DELL            |
| MSFT   | DD      | CSCO            |
| T      | F       | CREE            |

TABLE 8-continued

Top 5 Stocks from Growth, Index A, Tech Index Plus.

| GROWTH | INDEX A | TECH INDEX PLUS |
|--------|---------|-----------------|
| HD     | FTU     | LU              |
| BBY    | MRK     | IBM             |

Had the investor attempted to buy these stocks at a traditional broker with a $50 fee per stock, the investor would have spent $750 to acquire this portfolio. Assuming a $60,000 investment, that's a sizable expense, especially compared with a one-time charge of $30 or $60 to acquire the same portfolio through the present invention. Assuming hypothetically a $60 price for this well-diversified portfolio, that's a cost of 0.001. Assuming a cost of $750 for the same purchase by broker, that's a cost of 0.0125. Assuming a cost of $14.95 per trade that is still $224.25 or 0.00373.

A $10,000 investment at 11% for 40 years is worth around $650,000 while the same investment at 12% for 40 years is worth around $930,000. Percentages add up, especially when they work against you coming AND going. A $10,000 investment at 13% for 40 years is more than $1,327,000: almost double the aforementioned return on 11%. The price advantage of the present invention can be leveraged with each transaction that takes advantage of the lower cost and efficiency.

It is contemplated that annual rebalancing of portfolios may take place. As has been discussed, it is often helpful to sell "losers" before the expiry of one year so the loss may be counted against ordinary income. While it would be preferred that the selling of the "losers" would also be a basket trade executed by the user (or agent) with a special order generated by the PMP, it is not likely that independent brokers will allow those trades at the steep discount provided by the PMP. However, the "winners" would preferably be sold in that fashion, and the new replacement stocks would also be obtained through the PMP to keep trading costs down.

Another aspect of the present invention is an automated method of selecting stocks that allows for the cloning of mutual funds, account managers, or any other equity portfolio to derive an investment portfolio. Referring now to FIG. 17 in a preferred embodiment, the user enters the ticker symbol of the fund the user wants to clone. Software is used to access the individual components of the fund based on percentage of total assets. For example: The program will access the individual holdings of the fund based on percentage of total assets. For example, Microsoft, AOL, Amazon, Cisco, Pfizer, Coke, GE, Best Buy, etc. The software implementing the present invention will than analyze the portfolio across all factors, such as price-to-earnings ratio, price-to-book ratio, earnings growth rate, book value growth rate, dividend yield, market capitalization, etc. Any generic database such as S&P Compustat, Value Line, Marketguide, etc. can be used for the data feed. The underlying factor profile is than contrasted with the same factor for the market as a whole. For example, one might find that the average PE for this portfolio is 10 whereas it is 33 for the general market. That makes it a significant factor that defines the fund's (or fund manager's) unique style. One might also find that the market capitalization of the average stock in the fund is $22 Billion, compared with $10 Billion for the average stock. Each factor is compared with the average and median for the market and sorted by greatness of difference. For further background, see O'Shaughnessy's book *Invest Like the Best* (McGraw-Hill 1994) especially Chapter 3, incorporated herein by reference.

The factors are ranked in the order by which the fund most deviates from the market to create screens as in FIG. 17. For example, PE is 70% lower than the market; market capitalization is 120% higher, etc. The user is then invited to allow a backtest or to customize from the underlying factors. For example, the user might note the sales increase for the previous year is one of the largest deviations, but not want to use it as the criteria for his backtest and he could optionally remove that criteria.

Once the user has selected either the program's selected criteria or his customized version thereof, the program then backtests the selection criteria on historical data. For example, if the resultant criteria were:

1. PE<Market average;
2. Earnings gains >1.5 times the market average;
3. Earnings higher than in the previous year;
4. Price appreciation set high to get just 10, 15, 20 or 25 stocks.

The program would then run that set of criteria in each year for the last 30 years, gather the stocks which meet these specific criteria into an individual portfolio; hold the portfolio for the specified holding period (3, 6, 9, 12, or more months) and then calculate the return of each stock and over all portfolio return. The program will then provide the results of the backtest to the user The program will than inquire if the user would like to see the stocks which currently meet the tested criteria.

The user is shown the stocks that meet the criteria as of that day's date. The user is asked if he/she wishes to invest in the portfolio (as taught herein).

Referring now to FIG. 18A, the user starts with a rating service 1401 which is one of the mutual fund, private investment management, Unit Investment Trust, and other rating services commonly available such as Morningstar, Lipper, S&P Micropal, etc. Within each rating service, a scheme 1402 has been devised to group funds based on some criteria. When the user selects one of the schemes, the top holdings (for example 10, 25, or 50) of the funds in that group are presented in a list for consideration for investment as discussed herein.

Using the Morningstar database as an example, we would run a computer sort seeking all the funds that were included in its Domestic equity Large Growth category. On a recent sort, we discover that 497 funds are included in that category. Next, we look at all of the fund's individual equity holdings, and sort them based on how widely held each security is within the category. We next list them in declining order, listing the most widely held security first and so on—

1. Microsoft
2. Cisco Systems
3. Pfizer
4. Intel
5. MCI/Worldcom
6. Home Depot
7. EMC
8. GE
9. American International Group
10. Schering-Pluugh
11. Lucent
12. AOL
13. Wal-mart
14. Merck
15. Warner-Lambert
etc.

The user is queried to see if he/she wishes to invest in the top 10, 15, 20, 25, 30, 35, 40, 45, 50 stocks and whether he/she wishes to remove any of the individual names (as taught elsewhere herein).

Referring now to FIG. 18B, the user starts with a rating service 1501 and selects one of the other ratings service categories such as high technology, internet, biotechnology, or specialty-health. A example query of specialty health generates the following list of widely held issues:

1. Warmer-Lambert
2. Medtronic
3. Amgen
4. Merck
5. Pfizer
6. Eli Lilly
7. Cardinal Health
8. Guident
9. Schering-Plough
10. Bristol-Myers Squibb
11. Pharmacia Upjohn
12. American Home Products
13. Johnson&Johnson
14. Medimune
15. Biogen
etc.

Each rating services has a different preferred methodology for grouping funds. From the final groupings it is preferred to aggregate all of the stock holdings of all the funds in that category.

Morningstar defines its own Style Boxes as:

"The equity style box is a nine-box matrix that displays both the fund's investment methodology and the size of the companies in which it invests. Combining these two variables offers a broad view of a fund's holdings and risk.

"The Equity Style box for domestic-stock funds comprises two components: market capitalization on the vertical axis and valuation on the horizontal axis. Market Capitalization: Morningstar ties market cap to the relative movements of the market. The top 5% of the 5000 largest domestic stocks in Morningstar's equity database are classified as large-cap, the next 15% of the 5000 are mid-cap, and the remaining 80% (as well as companies that fall outside the largest 5000) are small-cap.

Morningstar then determines a fund's market cap by ranking the stocks in a fund's portfolio from the largest market-capitalized stock to the smallest, and then calculating the average weighted market capitalization of the stocks in the middle quintile (middle 40th percentile to 60th percentile) of the portfolio. After a fund's market cap has been determined, Morningstar places the fund in the large-cap, mid-cap, or small-cap group (noted above). Valuation: Morningstar categorizes funds by comparing the stocks in their portfolios with the most relevant of the three market-cap groups. Specifically, each stock in our equities database receives a price-to-earnings (P/E) score and a price-to-book (P/B) score. This is derived by dividing each stock's P/E and P/B by the asset-weighted median P/E and asset-weighted median P/B (respectively) of the stock's market cap group. For example, to calculate the asset-weighted median P/E, we first rank the P/E ratios of the stocks in each market-cap group from highest to lowest, then count down by their market caps until we reach the 50th percentile of that market-cap group. The P/E ratio attached to that stock is the asset-weighted median P/E. We do the same to find the asset-weighted median P/B. (We do not calculate these figures for international stocks.)

Next, we calculate the P/E Style Box Score and the P/B Style Box Score for each fund by ranking the stocks in a fund's portfolio by their P/E Scores and P/B Scores, respectively, and then calculating an average weighted P/E score and an average weighted P/B score from the stocks in the middle quintile of each fund's portfolio. (International stocks are again not included in this calculation.) These average weighted scores are the P/E Style Box Score and the P/B Style Box Score of the fund's portfolio.

For each measure, 1.00 represents the market-cap group average. If the fund has a P/E Style Box score+P/B Style Box Score that exceeds 2.25, the fund is categorized as growth. If the combined score falls below 1.75, the fund is categorized as value. Finally, if the score is between 1.75 and 2.25, the fund is categorized as blend. Generally speaking, a growth-oriented portfolio will mostly contain companies that its portfolio manager believes have the potential to increase earnings faster than the rest of the market. A value orientation, on the other hand, focuses on stocks that the manager thinks are currently undervalued in price and believes will eventually see their worth recognized by the market. A blend fund will mix the two philosophies: The portfolio may contain growth stocks and value stocks, or it may contain stocks that exhibit both characteristics."

FIG. 19 is a program in Java representing how an Aggregator function may be used to select stocks in the PMP as represented in multiple strategies.

While the above provides a full and complete disclosure of the preferred embodiments of this invention, equivalents may be employed without departing from the true spirit and scope of the invention. Such changes might involve alternate databases, processes, criteria, structural arrangement, capacities, sizes, operational features, reports or the like. Therefore the above description and illustrations should not be construed as limiting the scope of the invention, which is defined by the appended claims.

The invention claimed is:

1. An integrated Internet-connected computer-implemented system operated by a user for the account of an investor, said computer-implemented system comprising at least one computer containing at least one central processing unit, a display, and a memory containing computer-executable instructions for:
generating a profile of the investor, including receiving from the user responses to determine the investor's risk tolerance,
providing automated allocation advice to the user based on the investor's risk tolerance, the automated allocation advice including recommended investment percentages for a plurality of asset classes, wherein the plurality of asset classes includes equities,
generating at least one list of investments for an investment portfolio of the investor, including the selection of equities,
allowing the user to review the at least one list of investments and specific information about the at least one list of investments, such information including historic and/or hypothetical performance and a description of an asset selection methodology associated with the at least one list of investments,
allowing the user, after making appropriate reviews, to immediately and directly customize the at least one list of investments,
allowing the user, after making appropriate reviews, to make a decision to agree to purchase one or more lists of investments from the at least one list of investments selected by the user for purchase,
performing automated electronic execution of transactions pertaining to a list of investments from the at least one list of investments for the investment portfolio of the investor,
performing maintenance and monitoring of said investment portfolio, and
rebalancing of the investment portfolio in a weight prescribed by said automated allocation advice in an automated fashion.

2. The system of claim 1, further comprising computer-executable instructions for:
transmitting to the display news, alerts, and/or research about the assets in the investment portfolio of the investor.

3. The system of claim 1, further comprising computer-executable instructions for:
determining the best time to sell assets for maintenance or rebalancing of the investment portfolio of the investor so as to guide orders created by the system to maximize tax benefits to the investor.

4. The system of claim 1, further comprising computer-executable instructions for:
allowing the user to set up automatic email notification of rebalance dates.

5. The system of claim 1, further comprising computer-executable instructions for:
allowing the user to sign up for automatic proxy voting.

6. The system of claim 1, further comprising computer-executable instructions for:
determining if an investor has an account with an online broker and providing suggestions to select an online broker to create an account with if the investor does not have an account with an online broker.

7. The system of claim 1, further comprising computer-executable instructions for:
generating a unique order form for opening a brokerage account, identifying the system as the portal through which the broker's new client was generated.

8. The system of claim 1, further comprising computer-executable instructions for:
allowing the user to choose whether money belonging to the investor will be invested automatically when it is received by a broker after an account with that broker was set up to execute a transaction.

9. The system of claim 1, further comprising computer-executable instructions for:
providing the user with at least one list of investments for free, but withholding information that is the product of applying at least one list of investments to the current universe of stocks in the marketplace, until the user becomes a subscriber.

10. The system of claim 1, further comprising computer-executable instructions for:
allowing the user to associate the investment portfolio with an investment goal including retirement or education and for allowing the user to specify financial parameters for the investment goal including initial investment, horizon, contributions and withdrawal requirements.

11. The system of claim 1, wherein the user includes an investor.

12. A computer-implemented method employing an integrated Internet-connected system operated by a user for the account of an investor, said computer-implemented system comprising at least one computer containing at least one central processing unit, a display, and a memory containing computer-executable instructions, the method comprising:
generating a profile of the investor, including receiving from the user responses to determine the investor's risk tolerance,
providing automated allocation advice to the user based on the investor's risk tolerance, the automated allocation advice including recommended investment percentages for a plurality of asset classes, wherein the plurality of asset classes includes equities, generating at least one list of investments for an investment portfolio of the investor, including the selection of equities, allowing the user to review the at least one list of investments and specific information about the at least one list of investments, such information including historic and/or hypothetical performance and a description of an asset selection methodology associated with the at least one list of investments, allowing the user, after making appropriate reviews, to immediately and directly customize the at least one list of investments, allowing the user, after making appropriate reviews, to make a decision to agree to purchase one or more lists of investments from the at least one list of investments selected by the user for purchase, performing automated electronic execution of transactions pertaining to a list of investments from the at least one list of investments for the investment portfolio of the investor, performing maintenance and monitoring of said investment portfolio, and rebalancing of the investment portfolio in a weight prescribed by said automated allocation advice in an automated fashion.

13. The method of claim 12, further comprising:
transmitting to the display news, alerts, and/or research about the assets in the investment portfolio of the investor.

14. The method of claim 12, further comprising:
determining the best time to sell assets for maintenance or rebalancing of the investment portfolio of the investor so as to guide orders created by the system to maximize tax benefits to the investor.

15. The method of claim 12, further comprising:
allowing the user to set up automatic email notification of rebalance dates.

16. The method of claim 12, further comprising:
allowing the user to sign up for automatic proxy voting.

17. The method of claim 12, further comprising:
determining if an investor has an account with an online broker and providing suggestions to select an online broker to create an account with if the investor does not have an account with an online broker.

18. The method of claim 12, further comprising:
generating a unique order form for opening a brokerage account, identifying the system as the portal through which the broker's new client was generated.

19. The method of claim 12, further comprising:
allowing the user to choose whether money belonging to the investor will be invested automatically when it is received by a broker after an account with that broker was set up to execute a transaction.

20. The method of claim 12, further comprising:
providing the user with at least one list of investments for free, but withholding information that is the product of applying at least one list of investments to the current universe of stocks in the marketplace, until the user becomes a subscriber.

21. The method of claim 12, further comprising:
allowing the user to associate the investment portfolio with an investment goal including retirement or education and for allowing the user to specify financial parameters for the investment goal including initial investment, horizon, contributions and withdrawal requirements.

22. The method of claim 12, wherein the user includes an investor.

* * * * *